United States Patent
Gupta et al.

(10) Patent No.: US 9,167,505 B2
(45) Date of Patent: Oct. 20, 2015

(54) ACCESS MANAGEMENT FOR WIRELESS COMMUNICATION

(75) Inventors: Rajarshi Gupta, Santa Clara, CA (US); Anand Palanigounder, San Diego, CA (US); Fatih Ulupinar, San Diego, CA (US); Gavin B. Horn, La Jolla, CA (US); Parag A. Agashe, San Diego, CA (US); Jen Mei Chen, San Diego, CA (US); Manoj M. Deshpande, San Diego, CA (US); Srinivasan Balasubramanian, San Diego, CA (US); Sanjiv Nanda, Ramona, CA (US); Osok Song, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 723 days.

(21) Appl. No.: 12/246,383

(22) Filed: Oct. 6, 2008

(65) Prior Publication Data

US 2009/0094680 A1    Apr. 9, 2009

Related U.S. Application Data

(60) Provisional application No. 60/978,363, filed on Oct. 8, 2007, provisional application No. 61/025,686, filed on Feb. 1, 2008, provisional application No. 61/061,537, filed on Jun. 13, 2008.

(51) Int. Cl.
*G06F 7/00* (2006.01)
*H04W 48/08* (2009.01)
(Continued)

(52) U.S. Cl.
CPC ............ *H04W 48/08* (2013.01); *H04L 63/104* (2013.01); *H04W 12/08* (2013.01); *H04W 8/26* (2013.01); *H04W 12/06* (2013.01); *H04W 48/02* (2013.01); *H04W 48/14* (2013.01); *H04W 84/045* (2013.01)

(58) Field of Classification Search
CPC ..................................... H04W 28/24
USPC ........... 726/3, 7; 455/410, 411; 709/220, 230; 713/153
See application file for complete search history.

(56) References Cited

U.S. PATENT DOCUMENTS 5,835,737 A  11/1998  Sand et al.
6,185,416 B1  2/2001  Rudokas et al.
(Continued)

FOREIGN PATENT DOCUMENTS

CN   1794736 A   6/2006
CN   1852192 A   10/2006
(Continued)

OTHER PUBLICATIONS

International Search Report and Written Opinion—PCT/US2008/079112, International Search Authority—European Patent Office—Feb. 18, 2009.
(Continued)

*Primary Examiner* — Joseph P Hirl
*Assistant Examiner* — Sayed Beheshti Shirazi
(74) *Attorney, Agent, or Firm* — François A. Pelaez

(57) ABSTRACT

Provisioning and access control for communication nodes involves assigning identifiers to sets of nodes where the identifiers may be used to control access to restricted access nodes that provide certain services only to certain defined sets of nodes. In some aspects provisioning a node may involve providing a unique identifier for sets of one or more nodes such as restricted access points and access terminals that are authorized to receive service from the restricted access points. Access control may be provided by operation of a restricted access point and/or a network node. In some aspects, provisioning a node involves providing a preferred roaming list for the node. In some aspects, a node may be provisioned with a preferred roaming list through the use of a bootstrap beacon.

77 Claims, 22 Drawing Sheets

(51) Int. Cl.
  *H04L 29/06* (2006.01)
  *H04W 12/08* (2009.01)
  *H04W 8/26* (2009.01)
  *H04W 12/06* (2009.01)
  *H04W 48/02* (2009.01)
  *H04W 48/14* (2009.01)
  *H04W 84/04* (2009.01)

(56) References Cited

U.S. PATENT DOCUMENTS

| | | | |
|---|---|---|---|
| 6,405,038 B1 | 6/2002 | Barber et al. | |
| 6,618,366 B1 | 9/2003 | Furukawa et al. | |
| 6,636,491 B1 | 10/2003 | Kari et al. | |
| 6,717,925 B1 | 4/2004 | Leppisaari et al. | |
| 6,901,395 B2 | 5/2005 | Andrus et al. | |
| 6,904,025 B1 | 6/2005 | Madour et al. | |
| 6,920,559 B1* | 7/2005 | Nessett et al. | 713/168 |
| 6,957,067 B1 | 10/2005 | Iyer et al. | |
| 7,146,130 B2 | 12/2006 | Hsu et al. | |
| 7,165,152 B2* | 1/2007 | Blumenau et al. | 711/152 |
| 7,263,076 B1 | 8/2007 | Leibovitz et al. | |
| 7,263,078 B2 | 8/2007 | Krantz et al. | |
| 7,283,507 B2 | 10/2007 | Buckley et al. | |
| 7,356,001 B1 | 4/2008 | Jones et al. | |
| 7,363,038 B2 | 4/2008 | Kim et al. | |
| 7,369,555 B2* | 5/2008 | Jarl | 370/392 |
| 7,502,898 B2* | 3/2009 | Blumenau et al. | 711/152 |
| 7,551,925 B2 | 6/2009 | Simongini et al. | |
| 7,593,730 B2 | 9/2009 | Khandelwal et al. | |
| 7,603,119 B1* | 10/2009 | Durig et al. | 455/432.3 |
| 7,620,015 B2 | 11/2009 | Lenzarini | |
| 7,716,723 B1* | 5/2010 | Taylor et al. | 726/7 |
| 7,734,290 B2 | 6/2010 | Juneja et al. | |
| 7,761,607 B2 | 7/2010 | Hassan et al. | |
| 7,848,737 B2* | 12/2010 | Ramos Robles et al. | 455/411 |
| 7,916,701 B1 | 3/2011 | Viswanath et al. | |
| 7,953,406 B2 | 5/2011 | Itamiya et al. | |
| 8,089,974 B2 | 1/2012 | Calhoun et al. | |
| 8,150,397 B2 | 4/2012 | Khetawat et al. | |
| 8,190,146 B2 | 5/2012 | Beckmann et al. | |
| 8,315,246 B2* | 11/2012 | Shatzkamer et al. | 370/352 |
| 8,402,143 B2 | 3/2013 | Ramaswamy et al. | |
| 8,515,465 B2 | 8/2013 | Olsson et al. | |
| 8,626,156 B2 | 1/2014 | Marsico | |
| 2001/0020254 A1* | 9/2001 | Blumenau et al. | 709/229 |
| 2002/0022483 A1 | 2/2002 | Thompson et al. | |
| 2002/0037736 A1 | 3/2002 | Kawaguchi et al. | |
| 2002/0131407 A1 | 9/2002 | Muhonen | |
| 2003/0026262 A1* | 2/2003 | Jarl | 370/394 |
| 2003/0084287 A1* | 5/2003 | Wang et al. | 713/168 |
| 2003/0101246 A1 | 5/2003 | Lahti | |
| 2003/0139180 A1 | 7/2003 | McIntosh et al. | |
| 2004/0063455 A1 | 4/2004 | Eran et al. | |
| 2004/0073786 A1 | 4/2004 | O'neill et al. | |
| 2004/0087309 A1 | 5/2004 | Joshi et al. | |
| 2004/0092259 A1 | 5/2004 | Blanc et al. | |
| 2004/0142658 A1 | 7/2004 | McKenna et al. | |
| 2004/0145605 A1* | 7/2004 | Basu et al. | 345/740 |
| 2004/0192309 A1 | 9/2004 | Watanabe et al. | |
| 2004/0198220 A1 | 10/2004 | Whelan et al. | |
| 2005/0002407 A1 | 1/2005 | Shaheen et al. | |
| 2005/0050352 A1 | 3/2005 | Narayanaswami et al. | |
| 2005/0053043 A1 | 3/2005 | Rudolf et al. | |
| 2005/0066033 A1 | 3/2005 | Cheston et al. | |
| 2005/0147074 A1 | 7/2005 | Maufer et al. | |
| 2005/0261970 A1 | 11/2005 | Vucina et al. | |
| 2006/0002404 A1* | 1/2006 | Igarashi | 370/401 |
| 2006/0046661 A1 | 3/2006 | Ekvetchavit et al. | |
| 2006/0043560 A1 | 3/2006 | Herle | |
| 2006/0064588 A1* | 3/2006 | Tidwell et al. | 713/169 |
| 2006/0083205 A1 | 4/2006 | Buddhikot et al. | |
| 2006/0117103 A1* | 6/2006 | Brey et al. | 709/225 |
| 2006/0148460 A1 | 7/2006 | Mukherjee et al. | |
| 2006/0194582 A1 | 8/2006 | Cooper | |
| 2006/0217147 A1 | 9/2006 | Olvera-Hernandez et al. | |
| 2007/0004403 A1* | 1/2007 | Silvestri | 455/432.1 |
| 2007/0030824 A1 | 2/2007 | Ribaudo et al. | |
| 2007/0083470 A1 | 4/2007 | Bonner et al. | |
| 2007/0083657 A1* | 4/2007 | Blumenau et al. | 709/226 |
| 2007/0087756 A1 | 4/2007 | Hoffberg | |
| 2007/0093267 A1 | 4/2007 | Hosono et al. | |
| 2007/0105568 A1 | 5/2007 | Nylander et al. | |
| 2007/0124490 A1* | 5/2007 | Kalavade et al. | 709/230 |
| 2007/0153732 A1 | 7/2007 | Yao | |
| 2007/0155385 A1* | 7/2007 | Balasubramanian et al. | 455/436 |
| 2007/0156858 A1 | 7/2007 | Sood et al. | |
| 2007/0165585 A1* | 7/2007 | Monden et al. | 370/338 |
| 2007/0171881 A1 | 7/2007 | Zhang et al. | |
| 2007/0183427 A1* | 8/2007 | Nylander et al. | 370/395.2 |
| 2007/0197237 A1 | 8/2007 | Powell et al. | |
| 2007/0225898 A1 | 9/2007 | Pfleging et al. | |
| 2007/0232276 A1* | 10/2007 | Andersson | 455/414.1 |
| 2007/0258418 A1* | 11/2007 | Wurtenberger et al. | 370/338 |
| 2007/0270171 A1 | 11/2007 | Wentink | |
| 2007/0294760 A1 | 12/2007 | Sood | |
| 2008/0032740 A1 | 2/2008 | Joshi et al. | |
| 2008/0076413 A1* | 3/2008 | Jones | 455/432.3 |
| 2008/0076425 A1* | 3/2008 | Khetawat et al. | 455/436 |
| 2008/0117859 A1 | 5/2008 | Shahidi et al. | |
| 2008/0132164 A1* | 6/2008 | Bugenhagen et al. | 455/11.1 |
| 2008/0160942 A1 | 7/2008 | Koyama et al. | |
| 2008/0240052 A1 | 10/2008 | Gupta et al. | |
| 2008/0262974 A1* | 10/2008 | Kozisek | 705/77 |
| 2008/0267153 A1* | 10/2008 | Mukherjee et al. | 370/338 |
| 2009/0047960 A1* | 2/2009 | Gunnarsson et al. | 455/436 |
| 2009/0061870 A1* | 3/2009 | Finkelstein et al. | 455/435.2 |
| 2009/0068984 A1* | 3/2009 | Burnett | 455/408 |
| 2009/0070694 A1* | 3/2009 | Ore et al. | 715/764 |
| 2009/0086672 A1* | 4/2009 | Gholmieh et al. | 370/329 |
| 2009/0092122 A1 | 4/2009 | Czaja et al. | |
| 2009/0093232 A1* | 4/2009 | Gupta et al. | 455/410 |
| 2009/0094351 A1* | 4/2009 | Gupta et al. | 709/220 |
| 2009/0132675 A1 | 5/2009 | Horn et al. | |
| 2009/0156165 A1* | 6/2009 | Raghothaman et al. | 455/411 |
| 2009/0170519 A1 | 7/2009 | Wilhoite et al. | |
| 2009/0215429 A1* | 8/2009 | Caldwell et al. | 455/406 |
| 2009/0252073 A1 | 10/2009 | Kim et al. | |
| 2009/0264095 A1 | 10/2009 | Khetawat et al. | |
| 2009/0288145 A1* | 11/2009 | Huber et al. | 726/3 |
| 2009/0298470 A1* | 12/2009 | Huber et al. | 455/411 |
| 2010/0153706 A1* | 6/2010 | Haddad | 713/153 |
| 2011/0222514 A1* | 9/2011 | Couaillet et al. | 370/338 |
| 2011/0223886 A1 | 9/2011 | Nasielski et al. | |
| 2013/0021957 A1* | 1/2013 | Fang et al. | 370/311 |

FOREIGN PATENT DOCUMENTS

| | | |
|---|---|---|
| EP | 1449102 A1 | 8/2004 |
| EP | 1667358 | 6/2006 |
| EP | 1841267 | 10/2007 |
| JP | 2003289331 A | 10/2003 |
| JP | 2004187242 A | 7/2004 |
| JP | 2004522348 A | 7/2004 |
| JP | 2004328274 A | 11/2004 |
| JP | 2005286782 A | 10/2005 |
| JP | 2006280000 A | 10/2006 |
| JP | 2007068003 A | 3/2007 |
| JP | 2007116391 A | 5/2007 |
| JP | 2009510969 A | 3/2009 |
| JP | 2009510971 A | 3/2009 |
| JP | 2009512359 A | 3/2009 |
| KR | 101044501 | 6/2011 |
| RU | 2295200 C2 | 3/2007 |
| RU | 2297663 C2 | 4/2007 |
| RU | 2305900 C2 | 9/2007 |
| TW | 200423664 | 11/2004 |
| WO | WO02080607 A1 | 10/2002 |
| WO | WO03046742 A1 | 6/2003 |
| WO | WO03102730 | 12/2003 |
| WO | WO2004014024 | 2/2004 |
| WO | WO2004077753 | 9/2004 |
| WO | WO2005011134 | 2/2005 |
| WO | WO2005060562 | 7/2005 |

(56) References Cited

FOREIGN PATENT DOCUMENTS

| WO | 2005107169 A1 | 11/2005 |
|---|---|---|
| WO | WO2006076404 A2 | 7/2006 |
| WO | WO2007020515 A1 | 2/2007 |
| WO | WO2007040449 A1 | 4/2007 |
| WO | WO2007040451 A1 | 4/2007 |
| WO | WO2007044969 A2 | 4/2007 |
| WO | WO2007079329 | 7/2007 |
| WO | 2007089217 A2 | 8/2007 |
| WO | WO2007097673 | 8/2007 |

OTHER PUBLICATIONS

Moshiur Rahman et al: "Broadband-Facilitated Inter-WLAN Mobility Architecture" International Journal of Wireless Information Networks, Kluwer Academic Publishers-Plenum Publishers, NE, vol. 13, No. 3, Jun. 2, 2006, pp. 173-192, XP019397619.

Ott J et al: "Towards automated authentication for mobile users in WLAN hot-spots" Vehicular Technology Conference, 2005. VTC-2005-Fall. 2005 IEEE 62nd Dallas, TX', USA Sep. 25-28, 2005, Piscataway, NJ, USA, IEEE, vol. 2, Sep. 25, 2005, pp. 1232-1241, XP010878752.

Ray-Guang Cheng et al: "3G-based Access Control for 3GPP-WLAN Interworking" Vehicular Technology Conference, 2004. VTC 2004-Spring. 2004 IEEE 59th Milan, Italy May. 17-19, 2004, Piscataway, NJ, USA,IEEE, US, vol. 5, May 17, 2004, pp. 2967-2971, XP010766794.

"Universal Mobile Telecommunications System (UMTS); 3GPP system to Wireless Local Area Network (WLAN) interworking; WLAN User Equipment (WLAN UE) to network protocols; Stage 3 (3GPP TS 24.234 version 7.5.0 Release 7); ETSI TS 124 234" ETSI Standards, LIS, Sophia Antipolis Cedex. France, vol. 3-CN1; 3-CT1, No. V7.5.0, Mar. 1, 2007, XP014037810.

CT1,"LS on Closed Subscriber Groups for LTE Home Cells",S2-073679,3GPP TSG CT WG1 Meeting #59,Aug. 31, 2007.

Vodafone,"CR to 24.801 to Introduce Closed Subscriber Groups ",C1-071996,3GPP TSG CT WG1 Meeting #48,Aug. 24, 2007.

Panasonic,"CSG Cell Prioritization by UE",R2-073282,3GPP TSG RAN WG2 #59,Aug. 15, 2007.

Taiwan Search Report—TW097138758—TIPO—Feb. 1, 2012.

Vodafone, Telecom Italia ,"Mobility Management Identifiers in EPS Entities",C1-071669,3GPP TSG CT WG1 Meeting #48,Aug. 24, 2007.

Ericsson: "Idle state access restriction for home eNB", R2-073415, 3GPP TSG-RAN WG2#59, Aug. 24, 2007.

Ericsson: "Idle state access restriction for home eNB", R3-071492, 3GPP TSG-RAN WG3 #57, Aug. 24, 2007.

Nokia, Nokia Siemens Networks: "Access control for CSG cells", R2-072404, 3GPP TSG-RAN WG2 Meeting #58 bis, Jun. 29, 2007.

Taiwan Search Report—TW097138758—TIPO—Apr. 28, 2013.

Vodafone, "Geran to LTE Handover: Home Cell Deployment Considerations", 3GPP Workshop GERAN/RAN, TDoc GR-070020, Sep. 28, 2007.

Asustek, "CSG operation handling in IDLE mode", 3GPP Draft; R2-073941 CSG Operation Handling in Idle Mode, 3rd Generation Partnership Project (SGPP), Mobile Competence Centre ; 650, Route Des Lucioles ; F-06921 Sophia-Antipolis Cedex ; France, vol. RAN WG2, No. Shanghai, China; Oct. 2, 2007, XP050136586 [retrieved on Oct. 2, 2007] pp. 1-5, paragraph 1.

Vodafone Group, "Camping on and accessing to CSG cells in LTE_IDLE", R2-072828, 3GPP TSG RAN WG2#58bis, pp. 2, Jun. 29, 2007.

Vodafone Group, "Triggering of measurements in LTE_IDLE for CSG cells", R2-072825, 3GPP TSG RAN WG2#58bis, pp. 2, Jun. 29, 2007.

NTT DoCoMo et al., "Cell ID Assignment for Home Node B" 3GPP Draft; R1-073684 Cell ID Assignment for Home Node B, 3rd Generation Partnership Project (3GPP), Mobile Competence Centre ; 650, Route Des Lucioles ; F-06921 Sophia-Antipolis Cedex ; France, vol. RAN WG1, No. Athens, Greece; Aug. 15, 2007, XP050107280 [retrieved on Aug. 15, 2007] p. 2-p. 4.

* cited by examiner

ACCESS MANAGEMENT FOR WIRELESS COMMUNICATION

CLAIM OF PRIORITY UNDER 35 U.S.C. §119

This application claims the benefit of and priority to commonly owned U.S. Provisional Patent Application No. 60/978,363, filed Oct. 8, 2007, U.S. Provisional Patent Application No. 61/025,686, filed Feb. 1, 2008, and U.S. Provisional Patent Application No. 61/061,537, filed Jun. 13, 2008, the disclosure of each of which is hereby incorporated by reference herein.

CROSS-REFERENCE TO RELATED APPLICATIONS

This application is related to concurrently filed and commonly owned U.S. patent application Ser. No. 12/246,388 entitled "PROVISIONING COMMUNICATION NODES," and U.S. patent application Ser. No. 12/246,394, entitled "ACCESS TERMINAL CONFIGURATION AND ACCESS CONTROL," the disclosure of each of which is hereby incorporated by reference herein.

BACKGROUND

1. Field

This application relates generally to wireless communication and more specifically, but not exclusively, to improving communication performance.

2. Introduction

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

To supplement conventional mobile phone network base stations, small-coverage base stations may be deployed (e.g., installed in a user's home). In some aspects, these base stations may provide more robust indoor wireless coverage to mobile units. Such small-coverage base stations are generally known as access point base stations, Home NodeBs, or femto cells. Typically, such small-coverage base stations are connected to the Internet and the mobile operator's network via a DSL router or a cable modem.

In some scenarios, small-coverage base stations may be deployed in an ad-hoc manner. Consequently, there may be issues associated with accessing these base stations. For example, access terminals may need to be configured to access their associated base stations. In addition, it may be desirable to prevent unauthorized access terminals from accessing certain bases stations. Thus, there is a need for improved access management for wireless networks.

SUMMARY

A summary of sample aspects of the disclosure follows. It should be understood that any reference to the term aspects herein may refer to one or more aspects of the disclosure.

The disclosure relates in some aspect to provisioning communication nodes and providing access management for wireless communication. For example, identifiers may be assigned to sets of nodes where the identifiers may be used to control access to restricted access points that provide certain services only to defined sets of access terminals. Here, a restricted access point may, for example, provide certain services (e.g., different billing, additional services, different quality of service) for the access terminals of one or more preferred users but not for other users.

In some aspects provisioning a node may involve providing a unique identifier for a set of one or more nodes. For example, a unique identifier may be assigned to one or more restricted access points. Similarly, a unique identifier may be assigned to a set of access terminals that are authorized to receive service from one or more restricted access points. In some aspects a temporary identifier may be assigned to an access terminal whereby access to the node may involve mapping the temporary identifier to a permanent identifier for the access terminal.

Through the use of such identifiers, a desired level of access control may be achieved even though the nodes may be provisioned in an ad-hoc manner. In some aspects, access control may be provided by a restricted access point. In some aspects, access control may be provided by a network node. In some aspects, access control may be provided by cooperation of a restricted access point and a network node.

The disclosure relates in some aspects to provisioning a node with a preferred roaming list. In some aspects a node may be provisioned with a default preferred roaming list that the node may use to obtain another preferred roaming list for accessing restricted access points. In some aspects, a node may be provisioned with a preferred roaming list through the use of a bootstrap beacon.

BRIEF DESCRIPTION OF THE DRAWINGS

These and other sample aspects of the disclosure will be described in the detailed description and the appended claims that follow, and in the accompanying drawings, wherein:

Figure 1:
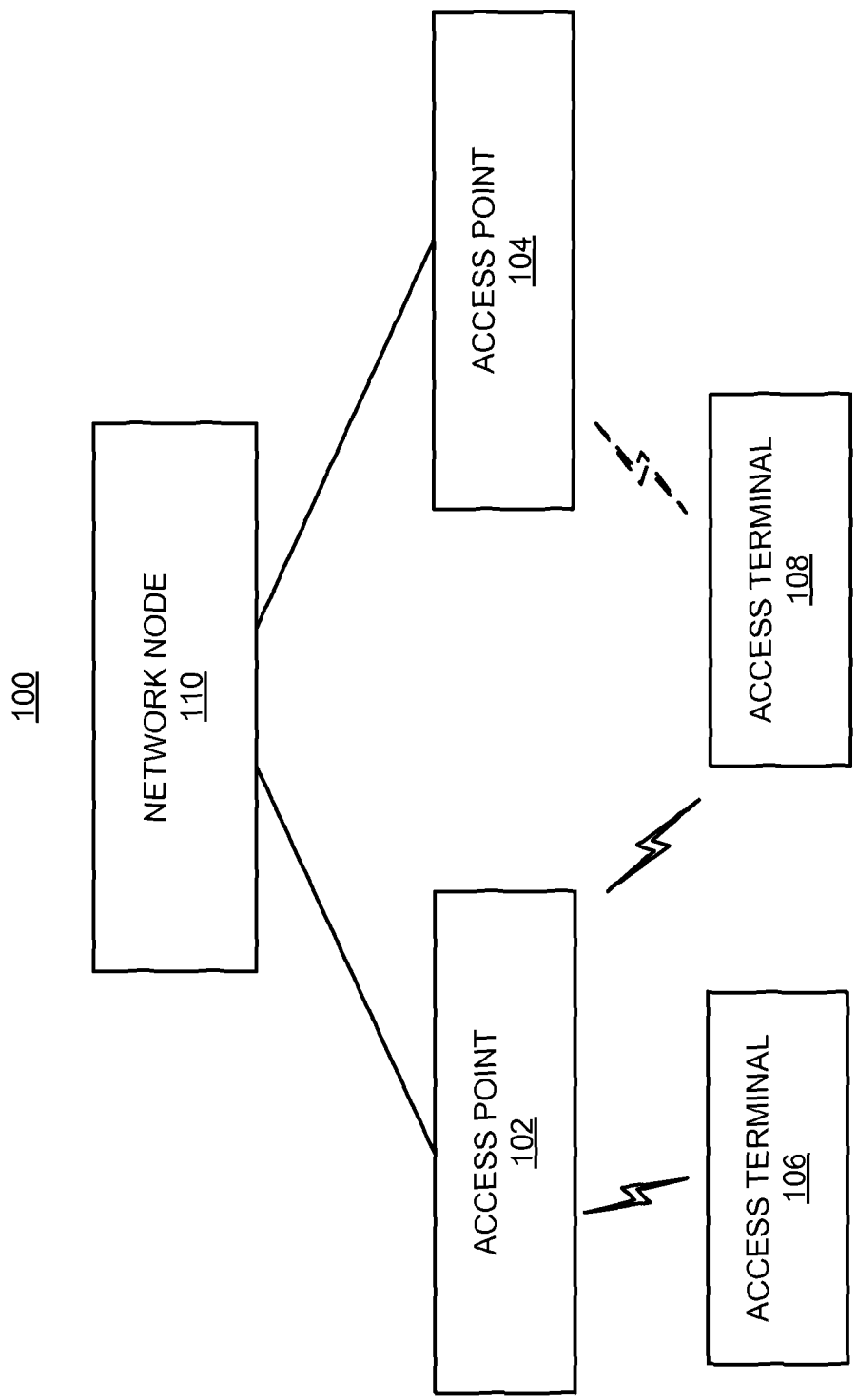
FIG. 1 is a simplified block diagram of several sample aspects of a communication system.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes in a sample communication system 100 (e.g., a portion of a communication network). For illustration purposes, various aspects of the disclosure will be described in the context of one or more network nodes, access points, and access terminals that communicate with one another. It should be appreciated, however, that the teachings herein may be applicable to other types of apparatuses or other similar apparatuses that are referenced using other terminology.

Access points 102 and 104 in the system 100 provide one or more services (e.g., network connectivity) for one or more wireless terminals (e.g., access terminal 106 and/or 108) that may be installed within or that may roam throughout an associated geographical area. In addition, the access points 102 and 104 may communicate with one or more network nodes 110 to facilitate wide area network connectivity. Such a network node may take various forms. For example, a network node may comprise a mobility manager or some other suitable network entity (e.g., a core network entity).

The access points 102 and 104 may be restricted in some aspects whereby each access point provides certain services to certain access terminals (e.g., access terminals 106 and 108) but not to other access terminals (e.g., a macro access terminal, not shown). For example, the access points 102 and 104 may be restricted to not provide to the other access terminals at least one of: registration, signaling, voice call, data access, or any other cellular service. Restricted access points may be deployed in an ad-hoc manner. For example, a given homeowner may install and configure his/her own restricted access point.

Figure 2:
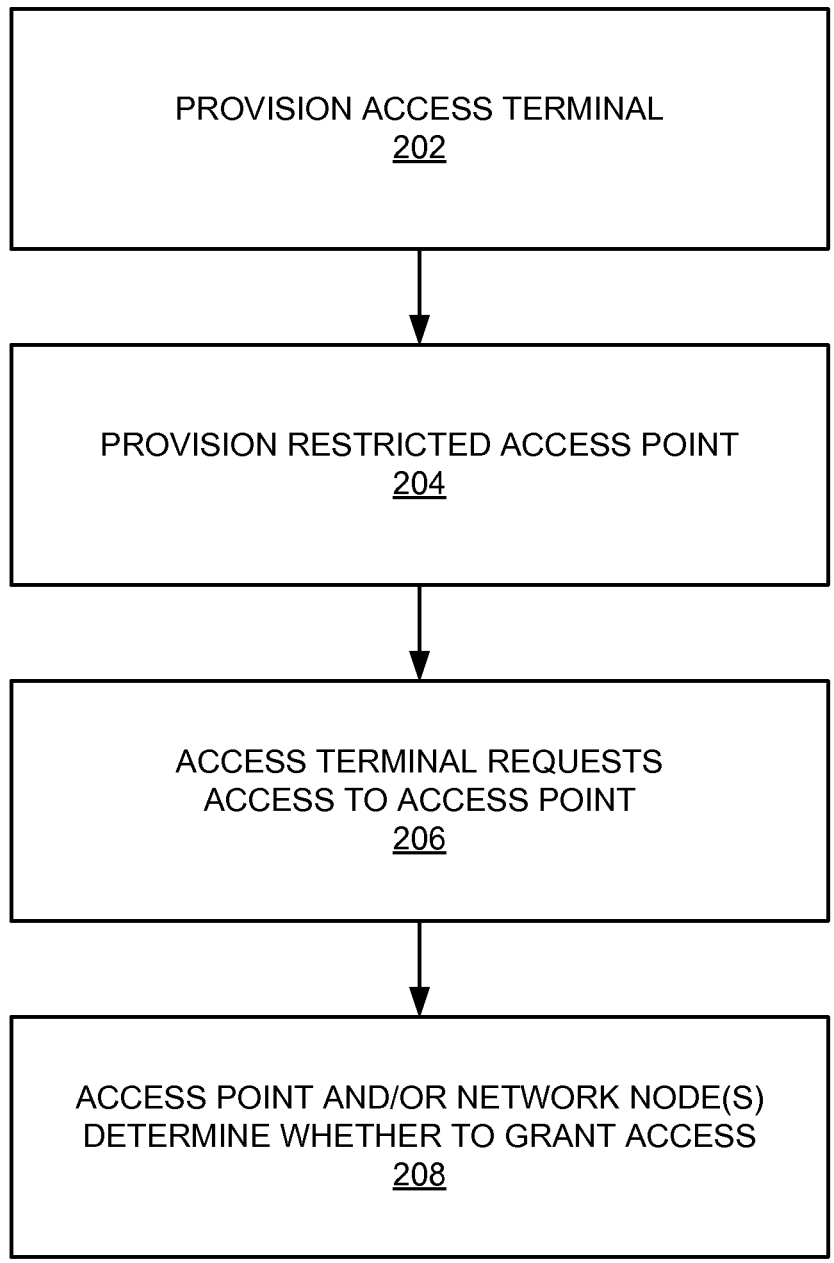
FIG. 2 is a flowchart of several sample aspects of operations that may be employed to provision network nodes and provide access control.

FIG. 2 provides an overview of several operations may be performed to facilitate deployment of restricted access points and the access terminals that are authorized to use these access points. In some aspects, these operations may be employed to enable a restricted access node to determine its identity, determine the identity of access terminals that are allowed to access (e.g., connect to) the restricted access point, and confirm the identity of an access terminal (e.g., an access terminal that is attempting to access the restricted access point). In some aspects, these operations may be employed to enable an access terminal to determine its identity, determine the identity of a restricted access point that the access terminal is allowed to access, translate temporary identity of the access terminal to permanent identity of the same, and confirm the identity of an access point (e.g., a restricted access point that the access terminal is attempting to access).

Figure 3:
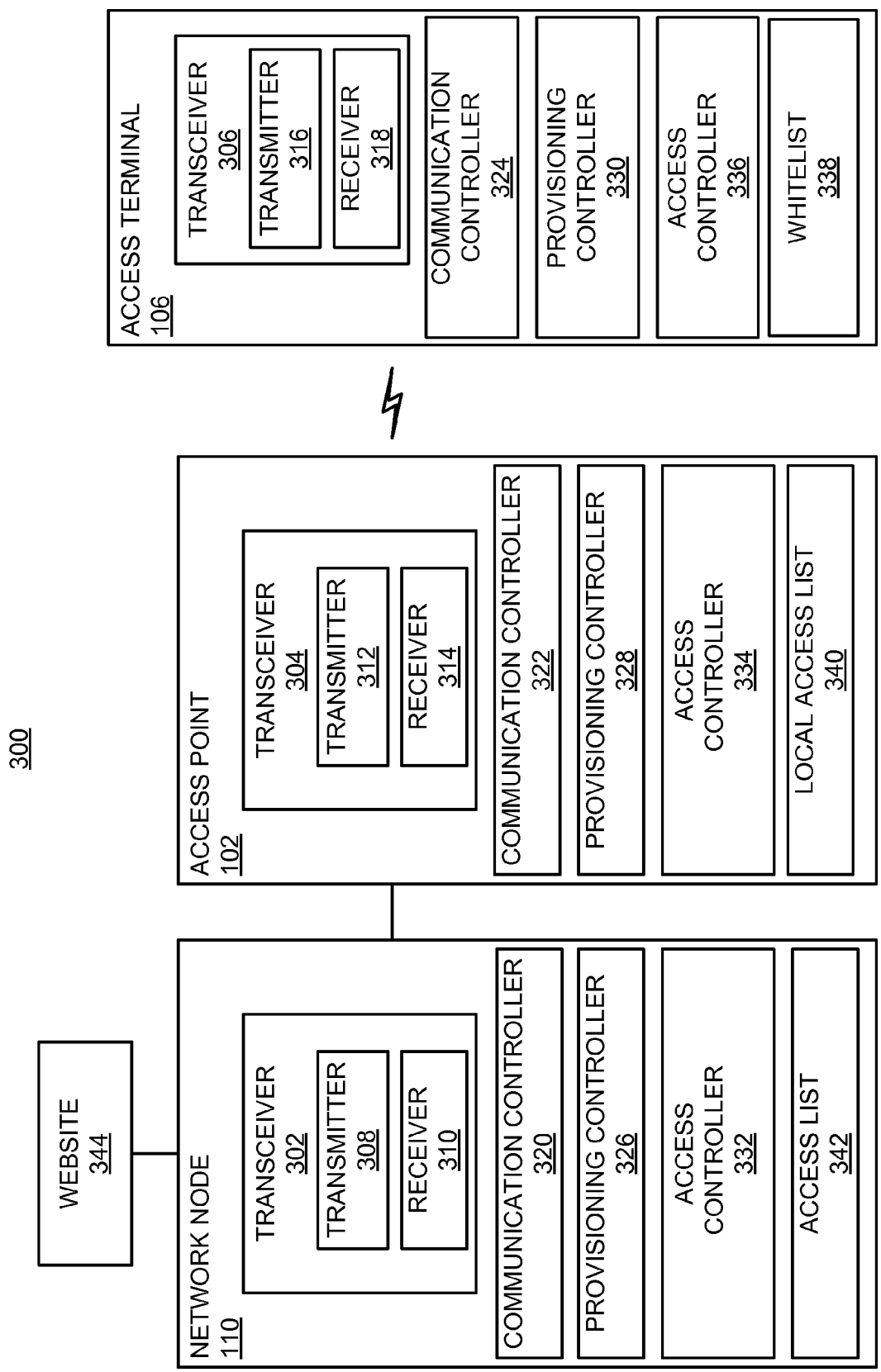
FIG. 3 is a simplified diagram of several sample network node components.

For convenience, the operations of FIG. 2 (or any other operations discussed or taught herein) may be described as being performed by specific components (e.g., components of the system 100 and/or components of a system 300 as shown in FIG. 3). It should be appreciated, however, that these operations may be performed by other types of components and may be performed using a different number of components. It also should be appreciated that one or more of the operations described herein may not be employed in a given implementation.

FIG. 3 illustrates several sample components that may be incorporated into the network node 110 (e.g., a mobility manager, mobile switching center, or serving GPRS support node), the access point 102, and the access terminal 106 in accordance with the teachings herein. It should be appreciated that the components illustrated for a given one of these nodes also may be incorporated into other nodes in a communication system. For example, the access terminal 108 may include components similar to those described for access terminal 106 and the access point 104 may include components similar to those described for access point 102.

The network node 110, the access point 102, and the access terminal 106 include transceivers 302, 304, and 306, respectively, for communicating with each other and with other nodes. The transceiver 302 includes a transmitter 308 for sending signals (e.g., messages) and a receiver 310 for receiving signals. The transceiver 304 includes a transmitter 312 for transmitting signals and a receiver 314 for receiving signals. The transceiver 306 includes a transmitter 316 for transmitting signals and a receiver 318 for receiving signals.

The network node 110, the access point 102, and the access terminal 106 also include various other components that may be used in conjunction with provisioning nodes and access management as taught herein. For example, the network node 110, the access point 102, and the access terminal 106 may include communication controllers 320, 322, and 324, respectively, for managing communications with other nodes (e.g., sending and receiving messages/indications) and for providing other related functionality as taught herein. The network node 110, the access point 102, and the access terminal 106 may include provisioning controllers 326, 328, and 330, respectively, for provisioning a node and for providing other related functionality as taught herein. The network node 110, the access point 102, and the access terminal 106 may include access controllers 332, 334, and 336, respectively, for providing access management and for providing other related functionality as taught herein. For purposes of illustration, all of the nodes are depicted in FIG. 3 as having functionality relating to provisioning and access control. In some implementations, however, one or more of these components may not be employed at a given node. The discussion that follows describes several different schemes (e.g., in conjunction with different figures) for provisioning network nodes and providing access control. For convenience, in these different schemes, the network node 110, the access point 102, and the access terminal 106 may be referred to as having different functionality and may be referred to as being representative of different types of nodes (e.g., in different implementations the network node 110 may represent an SRNC, or an MME, or a AAA, etc.). It should be appreciated, however, that in a given implementation, the network node 110, the access point 102, and the access terminal 106 may be configured in a specific manner.

Referring again to FIG. 2, as represented by block 202, each access terminal (e.g., access terminal 106) in a system may be provisioned to enable communication with one or more access points (e.g., access point 102). In the example of FIG. 3, these operations may be performed, for example, by operation of the provisioning controllers 326 and 330.

In some aspects, an operator may assign a unique identifier to the access terminal 106. In some implementations this identifier comprises a network access identifier ("NAI") or mobile station integrated services digital network ("MS ISDN") number. Alternatively, the subscriber identity such as International Mobile Subscriber Identity (IMSI) can also be derived from a subscriber identity module such as SIM, USIM, or VSIM present in the access terminal. In some cases this identifier is guaranteed to be unique within an operator domain (e.g., the entire network provided by a cellular operator). In some implementations, such an identifier may be part of the session information for the access terminal 106. For example, the identifier may be sent to the network node 110 (e.g., a session reference network controller, SRNC) by the access terminal 106 when the access terminal 106 creates a session or the identifier may be pushed to the network node 110 from an authentication, authorization, and accounting ("AAA") entity once a session is created. In some implementations, the identifier is accessible to a user so that the user may, for example, configure his or her restricted access point(s) to provide service to one or more access terminals. In some implementations an access terminal may be assigned a temporary identifier. For example, the network may assign permanent and temporary identifiers for the access terminal 106 and maintain those identifiers in the network. In addition, the network may send the temporary identifier to the access terminal 106 so that the access terminal 106 may use that identifier when it accesses an access point.

The access terminal 106 also may be provisioned with the identity of each access point (e.g., access point 102) that the access terminal 106 is allowed to access. As described in more detail below, this may involve, for example, sending access point identifiers to the access terminal 106 (e.g., a push model) and/or allowing the access terminal 106 to select the access points to be accessed by the access terminal 106 (e.g., a pull model). The access terminal 106 may thus maintain a list of authorized access points (e.g., a whitelist or preferred user zone list) that the access terminal 106 may reference as it moves through various wireless coverage areas.

In some implementations a user of the access terminal 106 may be prompted to determine whether he or she wishes to enable the access terminal 106 to access to an access point. In some implementations the access terminal 106 may automatically enable access to an access point. In some implementations the access terminal 106 may determine, based on configuration information at the access terminal 106, whether to automatically enable access or require a user prompt to enable access. In some implementations a user may elect to access or elect to not access one or more access terminals. In this case, a list of the allowed and/or rejected access terminal(s) may be maintained at the access terminal 106. In this way, the access terminal 106 may avoid (e.g., automatically prevent) attempting to access an access point on the list.

As represented by block 204, each restricted access point (e.g., access point 102) in a system may be provisioned to enable communication with one or more access terminals (e.g., access terminal 106). In the example of FIG. 3, these operations may be performed, for example, by operation of the provisioning controllers 326 and 328.

For example, a unique identifier may be assigned to the access point 102 or to a set of access points (e.g., access points 102 and 104). This unique identifier is different than a unique device identifier that may be assigned to identify individual access terminals in a system. As described in more detail below, such an identifier may comprises, for example, a special type of network identifier ("NID") or subnet identifier or an identifier assigned to a group of access terminals that have the same restricted association properties (e.g., a CSG). In some cases, the network may autonomously assign a unique identifier. In some cases, one or more access points may request an identifier (e.g., by determining a proposed identifier and sending it to the network). In these cases, the network may determine whether the requested identifier is already in use by one or more other access points. If the requested identifier is already in use, the network may select another identifier (e.g., a similar identifier) that is not is use by any other access point and send this identifier to the requesting access point(s).

The access point 102 also may be provisioned with one or more identifiers associated with each access terminal (e.g., access terminal 106) that is allowed to access the access point 102. As described in more detail below, this may involve, for example, storing access terminal identifiers in a database managed by a network and/or by storing access terminal identifiers in a local access list at the access point 102.

In some implementations the access control list for a given restricted access point may be managed at that restricted access point. For example, as discussed below in conjunction with FIG. 13, a user may configure his or her access point using an access terminal (e.g., a cell phone) or using a password protected webpage hosted at the restricted access point.

Alternatively, in some implementations an access control list for each restricted access point in a network is managed at the network (e.g., the core network). For example, as discussed below in conjunction with FIG. 4, an access control list may be managed at a web page hosted by the network operator. Managing the access control list at the network may provide one or more advantages in some contexts. In some aspects this approach may allow for more flexibility in policy. For example, the operator may limit access to restricted access points if desired and the operator may check records (e.g., for access terminals) in the same billing plan. In addition, the network may be more reliable than individual access points. Hence, reliability of the access control list may be improved. Also, since the access control list might not be sent to the restricted access point, there may be no need to provide a direct interface to the restricted access points (e.g., application software, USB ports, and so on). Furthermore, through the use of centralized access control lists, it may be easier to manage multiple restricted access points that belong to a common enterprise.

Once a restricted access point is provisioned, it may advertise its assigned identifier over-the-air. For example, the access point 102 may broadcast its identifier as part of its sector parameters, or in some other suitable manner.

As represented by block 206, once an access terminal is provisioned, the access terminal may monitor for signals (e.g., pilot/beacon signals) broadcast by nearby access points. As discussed in detail below, if the access terminal 106 identifies signals from the access point 102 (e.g., in a scenario where the access terminal 106 is allowed to access the access point 102), the access terminal 106 may request access to that access point 102. The identification of an accessible access point by the access terminal 106 may involve, for example, comparing an identifier associated with the access point 102 with a trusted list 338 of authorized access points (e.g., the whitelist) maintained by the access terminal 106. In the example of FIG. 3, these and other access-related operations may be performed, for example, by operation of the access controller 336.

As represented by block 208, the access point 102 and/or one or more network nodes (e.g., the network node 110) may determine whether to allow the access terminal 106 to access the access point 102. This access control operation may involve, for example, confirming the identity of the access terminal 106 and comparing an identifier of the access terminal 106 with a list of authorized access terminals maintained by the access point 102 (e.g., a local access list 340) and/or maintained by the network node 110 (e.g., a network database access list 342). In the example of FIG. 3, these and other access-related operations may be performed, for example, by operation of the access controller 334 and/or the access controller 332.

With the above overview in mind, additional details relating to provisioning and access control will be described with reference to FIGS. 4-13. It should be appreciated based on the teachings herein that one or more of the operations described in conjunction with a given one of these figures may be employed in conjunction with the operations described in another one of these figures. For convenience, these operations will be described with reference to the components of FIG. 1. It should be appreciated that these operations also may be applicable to other nodes in a network.

Figure 4:
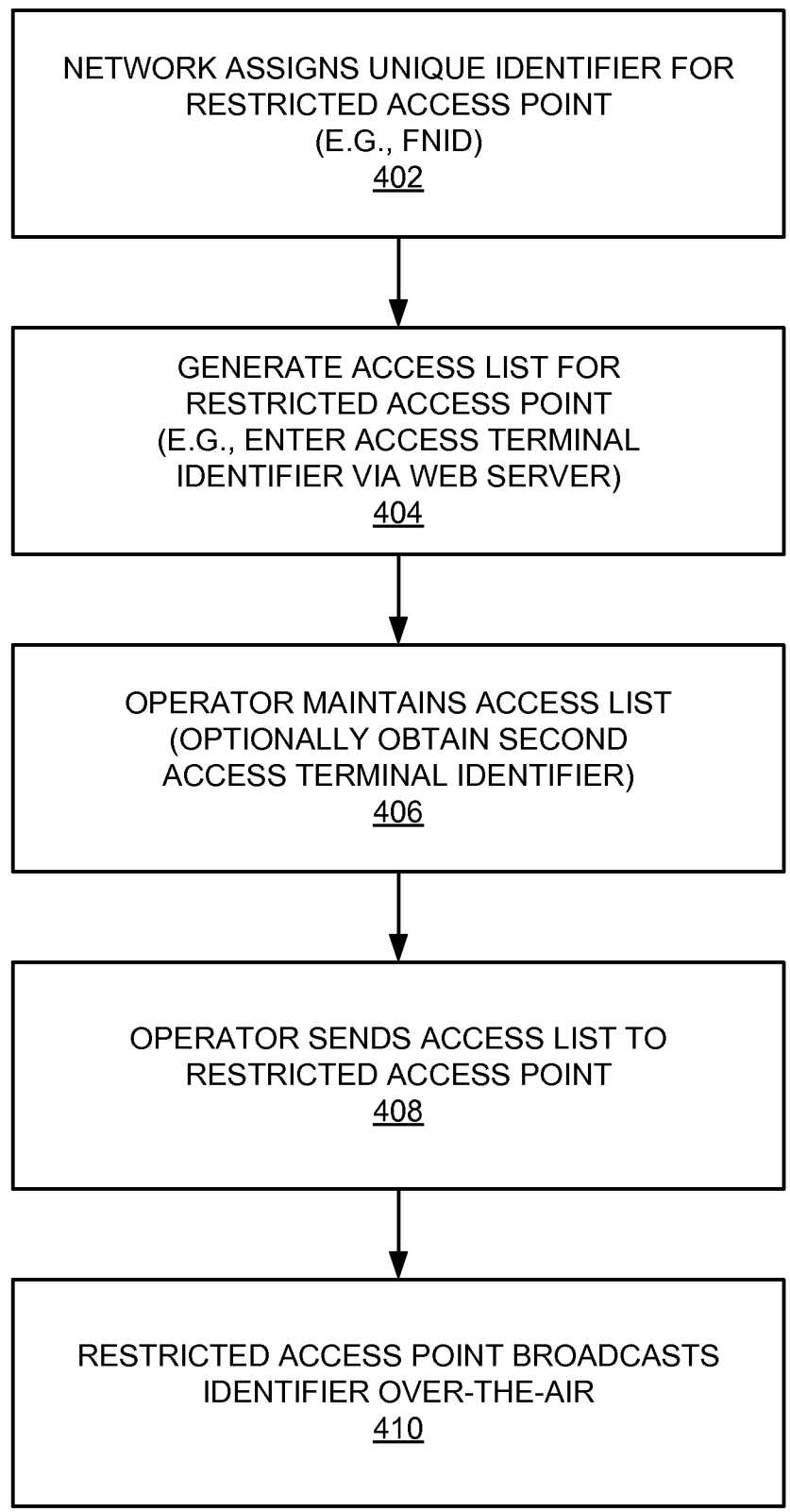
FIG. 4 is a flowchart of several sample aspects of operations that may be employed to provision an access point.

Referring initially to FIG. 4, several operations relating to provisioning a restricted access point are treated.

As represented by block 402, the network node 110 assigns an identifier (e.g., a unique identifier) for the restricted access point. In some cases this identifier is guaranteed to be unique within an operator domain (e.g., the entire network provided by a cellular operator). For example, a network entity may maintain an identifier database that is used to ensure the uniqueness of any assigned identifier.

The identifier may take various forms. In some implementations this identifier comprises a network identifier (e.g., a femto network identifier, "FNID"). In some implementations the identifier may comprise a closed subscriber group identifier ("CSG ID"). As mentioned above, a set of restricted access points (e.g., associated with the same administrative domain) may share a common identifier (e.g., a CSG ID). In some implementations a set of FNIDs may be associated with a common CSG. For example, a CSG may be assigned to an enterprise and different FNIDs may be assigned to different access points throughout the enterprise (e.g., in different buildings). In some implementations additional identifiers that may be user-readable (e.g., text-based) can also be used.

The unique identifier may be provisioned in various ways. For example, in some cases an identifier is chosen and configured when a user activates a restricted access point. Here, the identifier may be configured by an operator, at the point of purchase, or in some other manner.

As represented by block 404, a list of access terminals that are allowed to access the access point 102 (and, if applicable any other access points in a defined set of access points) is generated. This access list may include, for example, access terminal identifiers as discussed herein. Thus, such an identifier may identify an individual access terminal (e.g., an NAI or IMSI or MS ISDN) or a set of one or more access terminals (e.g., one or more access terminals associated with a given CSG). In addition, the access list may specify permissions (e.g., conditions for access) associated with a given access terminal.

In some implementations the access list may be managed through the use of a website 344 (e.g., accessible by a computer, a phone, or some other suitable device). In this way, the owner or user of the access point 102 may access the website to add, delete, or edit access terminal entries in the access list. For example, to enable a home or guest access terminal (e.g., access terminal 108) to access the access point 102, a user may add a permanent NAI of the access terminal to the access list via a webpage. Here, various naming conventions (e.g., user-readable identifiers such as "Joe's phone" and the like) may be associated with a unique access terminal identifier (e.g., NAI or MS ISDN) and one or more of these identifiers may be displayed on the webpage after they are added to the webpage.

As represented by block 406, in some implementations the access list is hosted by the network operator. For example, an operator may maintain a server for the access list website. In this way, the operator may approve any modifications to the access list (e.g., deny entries for access terminals from other operators).

As represented by block 408, access list information may then be sent to each access point or other network nodes that perform access control associated with a given access list. For example, the server may "push" the access list information to the access point 102 or the access point 102 may "pull" the access list information from the server. As an example of a "push" model, the access list may be sent from the operator website to a configuration server that then sends the access list to the access point 102. As another example, the access list may be sent from the operator website via the Internet to application software on the access point 102. As an example of a "pull" model, the access point 102 may query the configuration server to receive the latest version of the access list. Such a query may take place, for example, every time the access point 102 connects to the operator network (e.g., sets up a new IPSec connection). Thus, in the event the access point 102 goes "offline" for a period of time, the access point 102 may be ensured of receiving the latest version of the access list whenever it reconnects to the network.

By maintaining the access list at a location other than the access point 102, the access point 102 is relieved of the burden of maintaining the access list. This approach may provide improved access list management since the access list may be updated even when the access point 102 is off-line. In addition, such an approach may simplify managing an access list that is associated with more than one access point. For example, a single access list may be defined for a set of access points (e.g., associated with a given CSG). In this case, the access points may acquire the access list from a single source rather than having to coordinate with one another to manage (e.g., update) the access list across all of the access points.

The use of a centralized access list may also facilitate the use of temporary identifiers. For example, the access point 102 may use a given identifier for the duration that a given IPSec tunnel is established. When a new IPSec tunnel is established, the access list may be configured with a different set of identifiers. Here, the new set of identifiers may or may not identify the same access terminals as the prior version of the access list.

As represented by block 410, the access point 102 broadcasts its identifier (e.g., FNID or CSG ID) over-the-air. In this way, any access terminals that enter the coverage area of the access point 102 may identify the access point 102 and determine whether they are allowed to access the access point 102.

Figure 5:
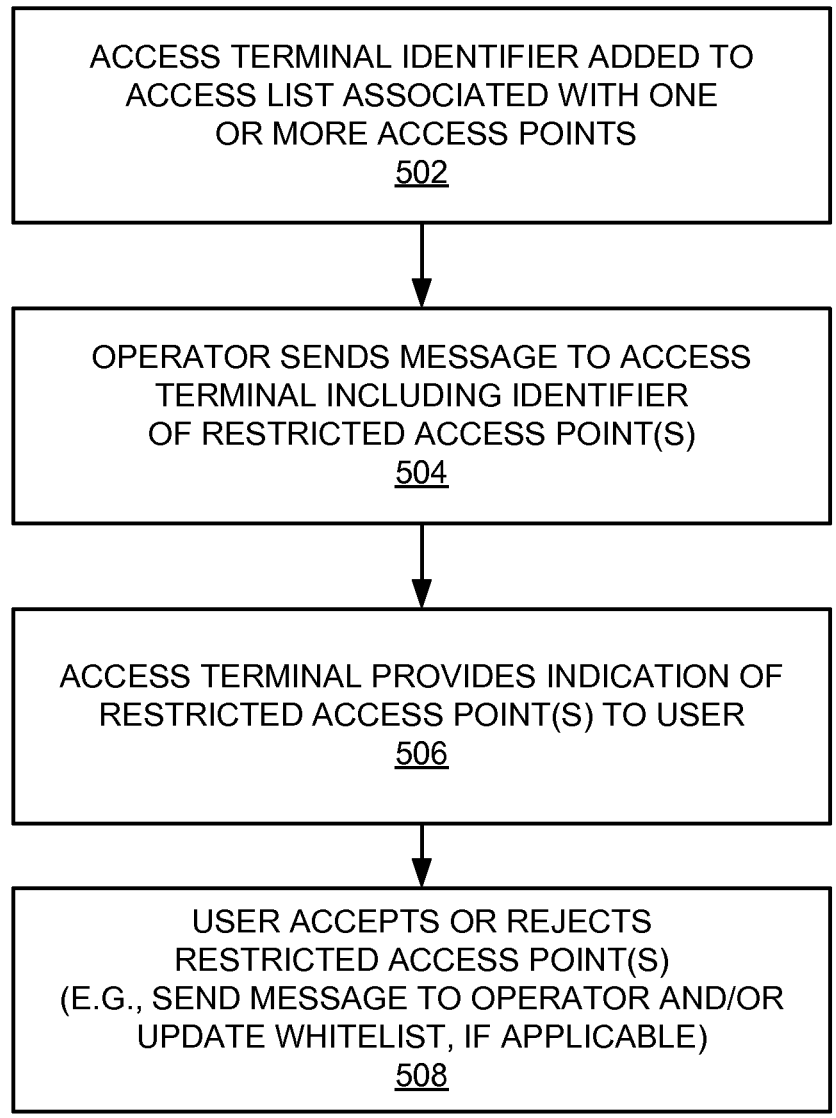
FIG. 5 is a flowchart of several sample aspects of operations that may be employed to provision an access terminal.
Figure 6:
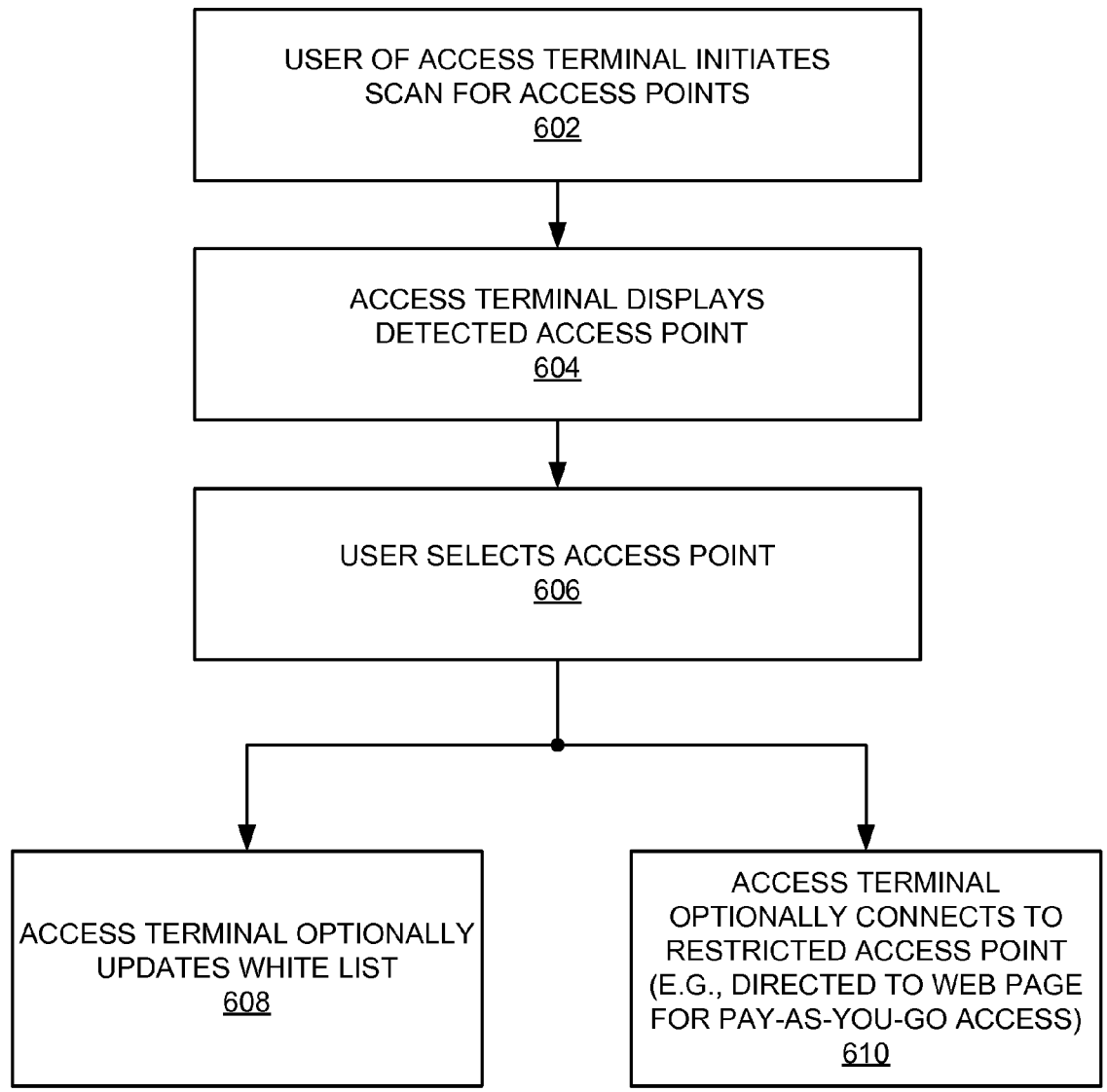
FIG. 6 is a flowchart of several sample aspects of operations that may be employed to provision an access terminal.

Referring now to FIGS. 5 and 6, several operations that may be employed to provision an access terminal are described. In particular, these figures describe techniques for provisioning an access terminal with the identity of one or more restricted access points that the access terminal is allowed to access.

FIG. 5 illustrates several operations that may be performed to "push" access list information to an access terminal (i.e., a push model). In this example, it is assumed that a unique identifier has been assigned to the access terminal (e.g., as discussed above).

As represented by block 502, at some point in time an access terminal may be designated as being allowed access one or more access points. For example, the owner of one or more access points may add a guest access terminal to the access list associated with the access point(s) as discussed above in conjunction with FIG. 4.

As represented by block 504, the operator sends a message to the access terminal that indicates that the access terminal is now allowed to access an access point or a set of access points. This message may include an identifier associated with the access point(s) (e.g., an FNID or a CSG ID) as well as any limitation that may be applicable (e.g., time limits for guest access). Such a message may be sent, for example, when an identifier of the access terminal 108 is added to an access list associated with the access point 102. Such a message also may be sent in various ways. For example, the network may send an SMS message, an application protocol message (e.g., open mobile alliance device management), a radio link message, a page, or some other type of message to the access terminal to convey the access point information (e.g., a query that asks the access terminal 108 whether is wishes to access the access point 102).

As represented by block 506, the access terminal 108 may then inform the user of the access terminal 108 that it is eligible to access the access point(s). For example, the access terminal 108 may display an indication of the identity of the access point(s), or provide some other form of indication. Such an indication may comprise, for example, the identifier assigned to the access point(s) or an alternate name (e.g., user-readable identifiers such as "Sue's house" or the like) that has been associated with the identifier.

As represented by block 508, the user may then determine whether to enable (e.g., using an input device on the access terminal 108) the requested access to the access point(s). Based on the user's decision, the access terminal 108 may update a list (e.g., a whitelist) it maintains of the access points it is allowed (e.g., enabled) to access. As discussed below, the access terminal 108 may use this list to determine which access points it may access as the access terminal 108 moves throughout the network. Here, the user may not need to provide any additional access authorization in the event the access terminal enters the coverage area of an access point in the list since the access terminal may automatically "remember" this access point. In some implementations the whitelist may be updated only after approval is received from the network operator.

In some implementations the access terminal 108 may send a message to the operator indicative of the user's decision. In this way, the operator may elect to modify the access list for the access point(s), if desired.

By allowing a user of an access terminal to accept or reject access to an access point, a user of an access point may be prevented from unilaterally enabling an access terminal (e.g., a neighbor's access terminal) to access that access point. Thus, the user of an access terminal may be assured that his or her information is not sent to an unauthorized access point.

Moreover, this "push" model does not require the access terminal to be in the vicinity of an access point to add an access point to its white list. In addition, as the access terminal may receive the "push" message only when it has been added to an access list, the possibility of a user selecting the wrong access point (e.g., one that the access terminal is not allowed to access) may be reduced.

FIG. 6 illustrates several operations that may be performed to "pull" access list information to an access terminal (i.e., a pull model). Again, it is assumed that a unique identifier has been assigned to the access terminal.

As represented by block 602, at some point in time a user of an access terminal (e.g., access terminal 108) initiates a scan for nearby access points. To this end, the access terminal 108 may include an input device that the user may control (e.g., a menu option) to cause the receiver 318 to monitor one or more channels for pilots signals or other signals from an access point.

As represented by block 604, the access terminal 108 informs the user of any access points that were detected as a result of the scan. For example, the access terminal 108 may display an indication of the identity of the detected access point(s), or provide some other form of indication. Again such an indication may comprise an identifier assigned to the access point(s), an alternate name, or some other suitable information.

As represented by block 606, the user may elect to enable access to one or more detected access points. For example, the user may control an input device on the access terminal 108 to select one or more access points that are displayed by the access terminal 108.

The access terminal then attempts to access the selected access point, if desired. As discussed below, in the event the user selected the wrong access point (e.g., one the access terminal is not allowed to access), the access point may deny access. The access point may then relay this information to the access terminal (e.g., to prevent this from happening again in the future).

As represented by block 608, in some implementations the access terminal 108 may update a list it maintains of the access points it is allowed to access (e.g., a whitelist) based on the user's decision. In this way, the access terminal 108 may "remember" a selected access point such that user input will not be needed for future visits to this access point (e.g., the access terminal 108 may connect to the access point without the need for the user to initiate another scan).

As represented by block 610, in some implementations a "pull" model may be employed to enable the access terminal 108 to access an access point on a conditional basis (e.g., pay-per-use). For example, several access points (e.g., belonging to a common owner such as a hotel or other enterprise) may all advertise the same unique identifier (e.g., FNID or CSG ID). When the access terminal is near one of these access points and the user of the access terminal 108 initiates a scan, the user may elect to connect to one of these access points (e.g., access point 102). When the access terminal 108 attempts to connect to the access point 102, the access point 102 may not check its local access control list to see whether the access terminal 108 is authorized for access, but may instead allow the access terminal 108 to make an initial connection. This initial connection may involve, however, redirecting the user to a webpage whereby the access terminal 108 may only receive service from the access point 102 if certain conditions are met (e.g., payment is made). Through the use of this model, any access terminal (as opposed to certain designated access terminals) may gain access to the associated set of access points.

As mentioned above, an access point and/or a network node may control whether a given access terminal is allowed to access the access point. In some implementations access control for a given restricted access point may be managed at that restricted access point. In some implementations access control for a given restricted access point may be managed at that restricted access point with assistance from a centralized access control manager (e.g., implemented in a network node). FIGS. 7-11 illustrate several techniques that may be used to control such access.

Figure 7:
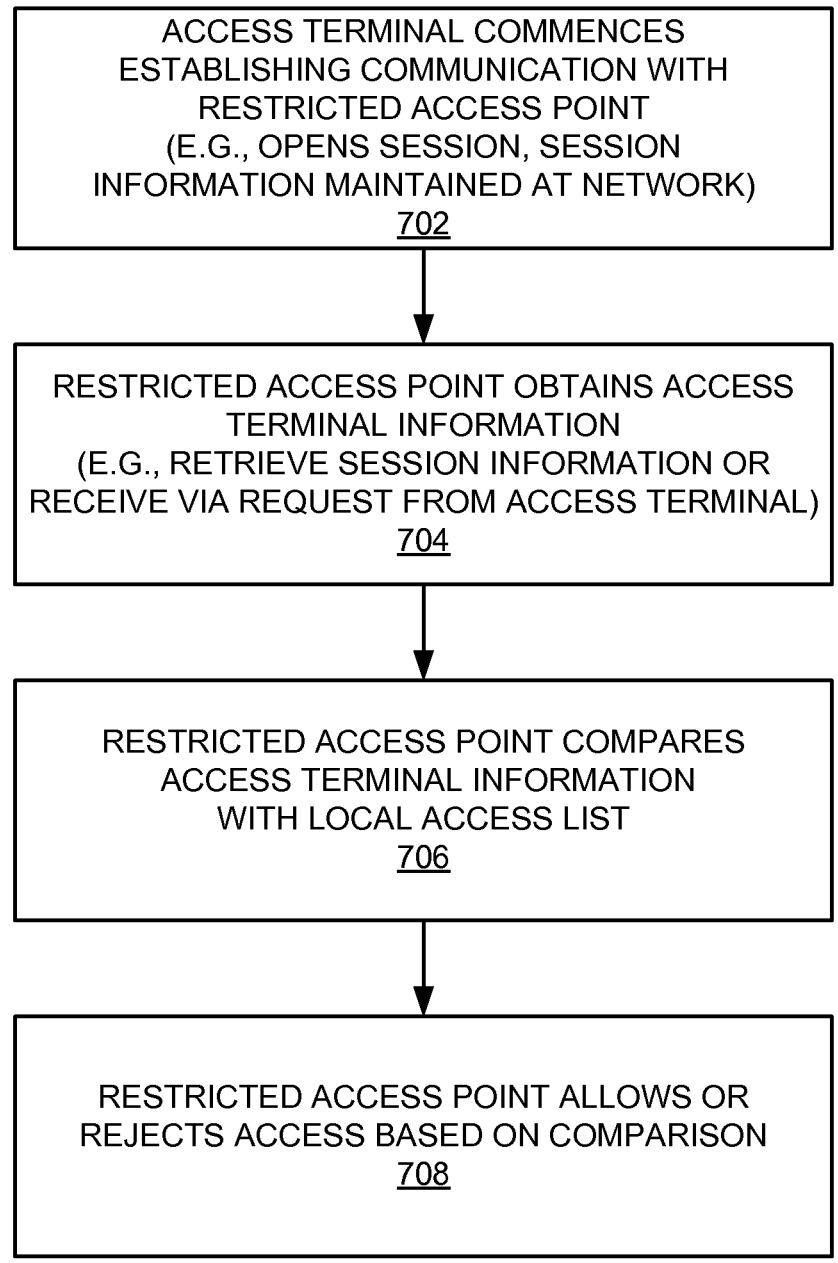
FIG. 7 is a flowchart of several sample aspects of operations that may be employed to provide access control.
Figure 8:
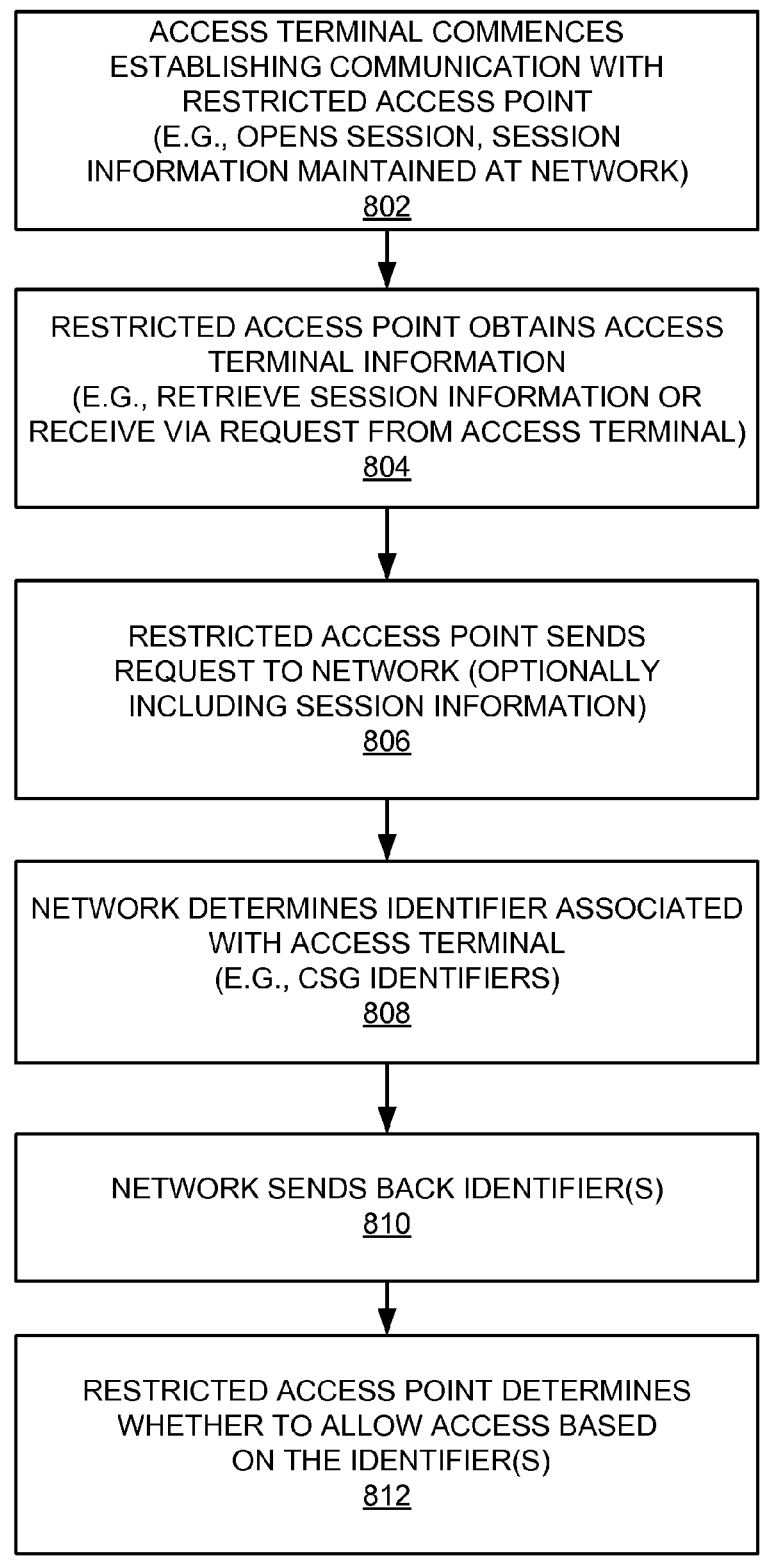
FIG. 8 is a flowchart of several sample aspects of operations that may be employed to provide access control.

Referring initially to FIG. 7, several operations are described relating to a scenario where an access point controls access to itself. In some aspects, the access granted by the access point may be conditional. For example, if the access point determines that access should not be granted to a certain service, the requested access may be unilaterally denied. However, if the access point determines that access should be grant to a given service, the access point may send a request to the network to confirm whether access should be allowed.

In some implementations an access point may control (e.g., unilaterally control) access to a local service. For example, an access terminal may attempt to gain access to a service provided on a local network associated with the access point. Such services may include, for example, access to a local server (e.g., to access audio, video, data or other content), access to a printer, and so on.

As represented by block 702 of FIG. 7, at some point in time an access terminal (e.g., access terminal 108) commences establishing communication with a restricted access point (e.g., access point 102). In conjunction with this operation, the access terminal 108 may attempt to open a session (or route) to the access point 102. In addition, the associated session information may be stored at the network (e.g., at network node 110). To facilitate the access point 102 confirming the identity of the access terminal 108, in some cases an identifier of the access terminal 108 may be part of the session information (e.g., included in the context information for the access point). This identifier may comprise, for example, a permanent identifier (e.g., NAI) as discussed herein.

As represented by block 704, the access point 102 may obtain information to confirm the identity of the access terminal 108. For example, in some cases the access point 102 may receive an identifier (e.g., a temporary identifier) or other suitable information directly from the access terminal 108 (e.g., over-the-air). In some cases the access point 102 may retrieve the above-mentioned session information including the access terminal identifier (e.g., a temporary or permanent identifier) from the network (e.g., from the SRNC). Advantageously, in this latter scenario, transmission of the identifier (e.g., the permanent NAI) over-the-air may be avoided.

In cases where a temporary identifier is used (e.g., a temporary NAI), the access point 102 may cooperate with the network to ensure the validity of the identifier. For example, in some implementations the access point 102 sends the temporary identifier to a AAA entity that authenticates the identifier. In some implementations the access point 102 sends the temporary identifier to the network and receives the associated permanent identifier in response. In this case, the access point 102 may use the permanent identifier to authenticate the access terminal 108.

As represented by block 706, the access point 102 compares the access terminal information (e.g., a temporary or permanent identifier) with the information in its local access list (e.g., represented by local access list 340 in FIG. 3). As discussed above, the local access list may be configured to include a unique identifier associated with the access terminal 108 (e.g., NAI, CSG ID, etc.).

As represented by block 708, the access point 102 may then allow or reject the requested access based on the comparison at block 706. Here, the access point 102 may send a rejection message to the access terminal 108 and/or the access point 102 may redirect the access terminal 108 to a different access point (e.g., by sending a redirection message that identifies the local macro access point).

As described below, in some implementations the access terminal 102 may cooperate with the network to authenticate the access terminal 108. For example, in the event the access terminal identifier is not in the local access list, the access point 102 may send a request to a network node such as a AAA entity that provides authentication, etc., for restricted access points (e.g., a femto AAA implemented, for example, as a standalone entity or by incorporating corresponding functionality into a traditional network AAA entity). Here, the network node may maintain an access control list for the access point 102 that the network node uses to authenticate the access terminal 108 (e.g., in a similar manner as discussed above). In addition, if applicable, the network node may cooperate with another network node (e.g., a AAA entity for the access terminal 108) to derive a permanent identifier associated with the access terminal 108 from the identifier that was sent to the access point 102 by the access terminal 108. The access point 102 may then allow or reject the requested access based on a response it receives from the network node indicative of whether the access terminal 108 is authorized to access the access point 102. In accordance with the teachings herein, access control functions may be performed at the access point or another network entity such as a gateway, mobile switching center ("MSC"), serving GPRS support node ("SGSN"), packet data serving node ("PDSN"), or MME in various implementations Referring now to FIG. 8, several operations are described relating to a scenario where the network sends a list of access terminal identifiers (e.g., the access point's access list) to an access point so that the access point may determine whether to grant a request for access from an access terminal. In this example, the operations of blocks 802 and 804 may be similar to the operations of blocks 702 and 704 described above. In this scenario, however, the access point 102 may not retrieve the session information in some cases.

As represented by block 806, the access point 102 sends a request to the network (e.g., a network node 110) to authenticate the access terminal 108. In the event the access point 102 has obtained the session information (e.g., including access terminal identifier information such as an MS ISDN, a CSG ID or an NAI), the access point 102 may send this information to the network node 110 in conjunction with the request (e.g., included in the request message). In some implementations, this operation may involve a request for the access terminal identifier list. In practice, the access point 102 may request this list at various times (e.g., whenever the access point powers up or connects to a network, whenever an access terminal attempts to access the access point, periodically, and so on).

As represented by block 808, the network node 110 obtains an identifier associated with the access terminal 108. This identifier may comprise, for example, a list of identifiers that indicate one or more access groups associated with the access terminal. For example, the identifier may comprise a list of closed subscriber groups of which the access terminal 108 is a member, a list of access terminals that are allowed to access the access point 102 (e.g., an access list of the access point 102), or a list of identifiers of access points that the access terminal 108 may access. The determination of the identifier by the network node 110 may comprise, for example, receiving the identifier from another network node (e.g., an HSS) or obtaining the identifier from a local database. In some implementations, determining the identifier may involve determining a permanent identifier as discussed herein (e.g., based on a received temporary identifier). The network node 110 sends the identifier or identifiers obtained at block 808 to the access point 102 at block 810.

As represented by block 812, the access point 102 may then determine whether to allow or deny the requested access based on the received identifier(s). For example, the access point may compare the received identifier (e.g., a CSG ID) indicative of the sets to which the access terminal 108 belongs with the information (e.g., a CSG ID) in the local access list of the access point 102 that is indicative of the sets to which the access point 102 belongs. The access point 102 may then allow or reject the requested access based on this comparison.

Figure 9:
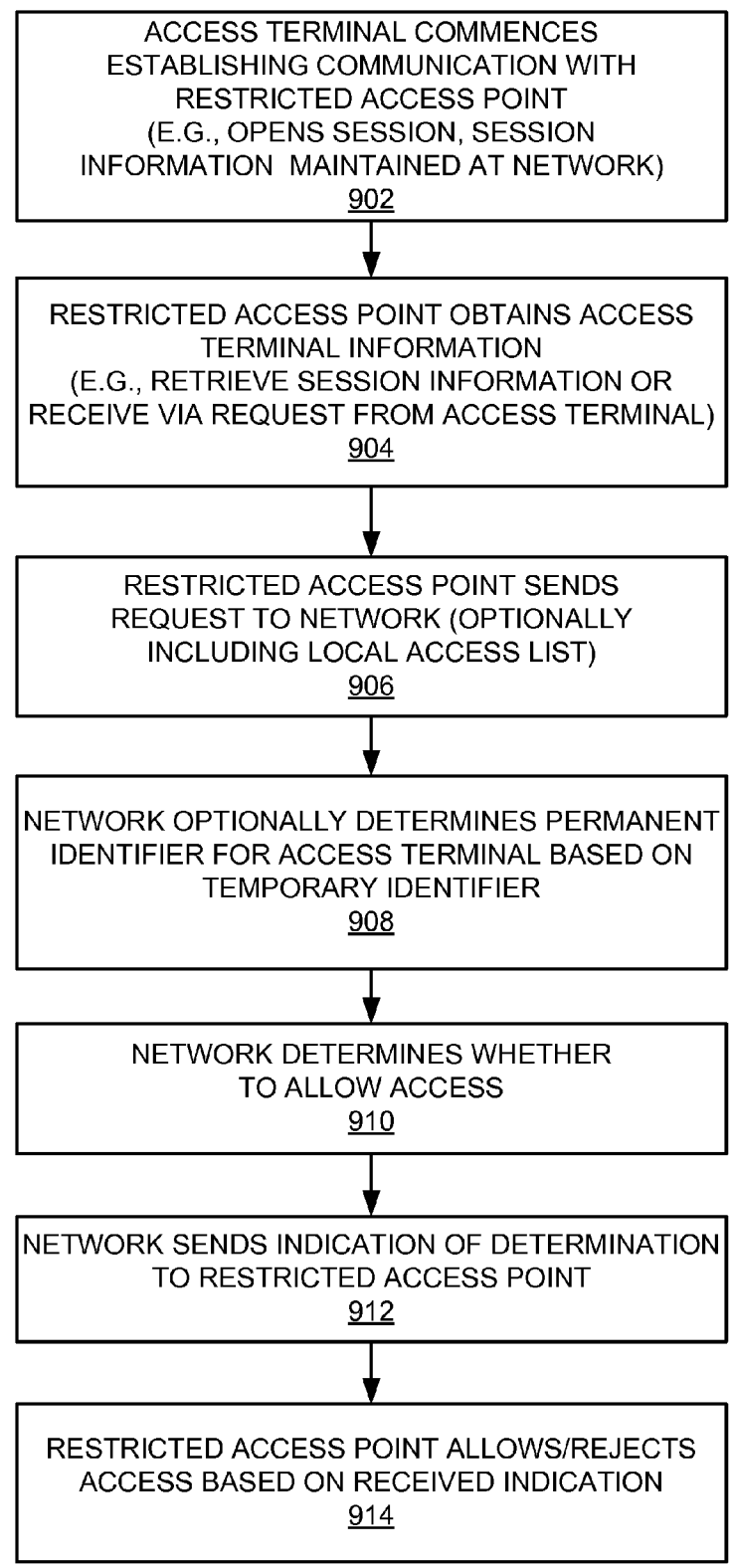
FIG. 9 is a flowchart of several sample aspects of operations that may be employed to provide access control.

Referring now to FIG. 9, several operations are described relating to a scenario where a network controls access to an access point. In this example, the operations of blocks 902, 904, and 906 may be similar to the operations of blocks 802, 804, and 806 described above. Again the access point 102 may not retrieve the session information in some cases. In addition, in some cases the access point 102 may send its local access list to the network for use in the authentication operation.

As represented by block 908, in implementations that use temporary identifiers to identify one or more nodes (e.g., access terminals), the network node 110 (e.g., a femto AAA) may determine a permanent identifier associated with the access terminal 108 based on a temporary identifier associated with the access terminal 108. For example, the access point 102 may have obtained a temporary identifier from the access terminal (e.g., at block 902) or from the session information (e.g., at block 904). In such a case, the access point 102 may send a temporary identifier (e.g., a temporary NAI) for the access terminal 108 along with an identifier (e.g., FNID) of the access terminal 102 to the network node 110 in conjunction with the request at block 906. As discussed above in conjunction with FIG. 7, the network node 110 may then cooperate with another network node to derive a permanent identifier of the access terminal 108 from the temporary identifier.

As represented by block 910, the network node 110 determines whether to allow the access terminal 108 to access the access point 102. For example, the network node 110 may compare an identifier of the access terminal 108 (e.g., an NAI, a CSG ID, etc.) with an access list of the access point 102. Here, the access list may be the local list obtained from the access point 102 or may be an access list maintained by the network (e.g., based on information obtained from a webserver as discussed above). The network node 110 may then determine whether to allow or reject the requested access based on this comparison.

As represented by block 912, the network node 110 sends an indication of this determination to the access point 102. The access point 102 may then allow or reject the requested access based on the received indication (block 914). Advantageously, in implementations such as these, the access point 102 need not be aware of the actual identity of the access terminals that access the access point 102. In addition, the access control list for the access point 102 does not need to be sent to the access point 102. In such an implementation, access control is entirely performed in the network node transparent to access point.

Various techniques may be used to manage access terminal identifiers in a network. As mentioned above, an access point may store the valid identifier (e.g., NAI) used by an access terminal. In some implementations this identifier may remain valid for a defined period of time. Here, if an access terminal revisits an access point within the period of time (i.e., the access terminal has the same identifier during this time), the access point may accept the access terminal without obtaining authorization from the network (e.g., the femto AAA). In some implementations an operator may choose whether to use a temporary identifier or a permanent identifier for the access terminals. If a permanent identifier is used, the permanent identifiers may be stored at the access points (e.g., in the local access list 340) such that the access point may independently authenticate the access terminals. If a temporary identifier is used, the operator may control the frequency at which access points check with the network (e.g., the femto AAA) to verify the identifiers stored in the local access list 340.

Figure 10:
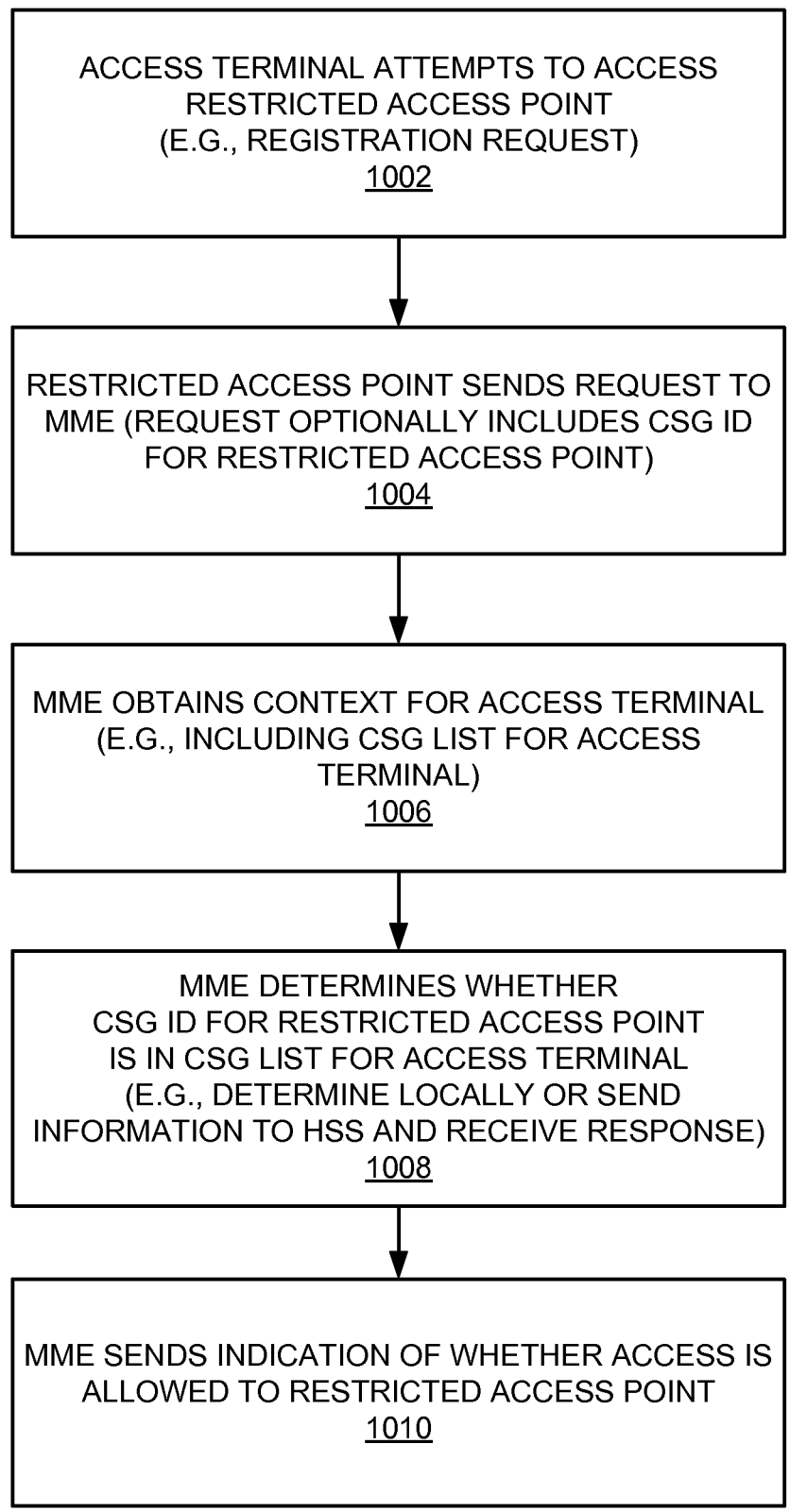
FIG. 10 is a flowchart of several sample aspects of operations that may be employed to provide access control.

FIG. 10 illustrates an example of access control operations that may be performed in an implementation utilizing long-term evolution ("LTE") or other similar technology. In this example, the network (e.g., the core network as opposed to the radio access network) controls whether an access terminal is allowed to access an access point. In addition, techniques are described for provisioning access terminals and access points with CSG subscription information (e.g., matching information), enforcing access control (e.g., for idle mode or active mode), modifying the provisioning of an access point or access terminal, and enforcing a CSG list when an access terminal performs operations such as power up, trekking area update, and handover.

The network (e.g., a home subscription server, "HSS" or a CSG subscription server) may maintain CSG subscription information for access terminals and restricted access points in the network. In a similar manner as described above, an operator may provide a webserver that enables a user to manage CSG subscription information for his or her restricted access point(s). For example, a user can modify his or her subscription information (e.g., MS ISDNs) using a website. The network may then approve the modifications (e.g., access terminal entries) made by the user and the webserver may send the subscription information to the network (e.g., HSS). Here, the MS ISDN may be converted to an IMSI. The network may then send the CSG information (e.g., a unique CSG identifier) to the corresponding restricted access point(s). In addition, the network may send the CSG subscription information to an MME when an associated access terminal is registered to the MME.

Also as described above, provisioning of an access terminal (e.g., with a list of unique CSG IDs) may be approved by the owner the access terminal. In addition, the operator may also approve the provisioning of the access terminal. Here, a given CSG ID may be associated with a set of one or more access terminals that are authorized to receive at least one service from a set of at least one restricted access point. In other words, the set of access terminals and the set of access points are all associated with a common CSG ID. It also should be appreciated that a given access terminal or access point also may be associated with multiple CSGs. In some aspects, the network (e.g., the HSS) may maintain information indicative of the mapping between an identifier of an access terminal and the subscribed CSG ID. In addition, since the HSS is connected to the MME, the MME may retrieve the CSG information and relay it to the restricted access points, if desired.

Again, access terminal provisioning may involve a "push model" or a "pull" model. For example, in the former case the network (e.g., a network node) may send an SMS message to the access terminal to inform the access terminal of a new subscription (e.g., identifying one or more CSG IDs) and the user either accepts or rejects the subscription. In the latter case, the user may initiate a manual scan and the access terminal displays a list of nearby access points (e.g., user-readable CSG IDs or other types of access point identifiers) so that the user may select one or more entries from the list, if desired.

As represented by block 1002 of FIG. 10, at some point in time the access terminal commences accessing the restricted access point. For example, when the access terminal 108 determines that it is in the vicinity of the access point 102 (e.g., where the access point 102 advertises a CSG ID that is also associated with the access terminal 108), the access terminal 108 may send a registration request or other suitable message to the access point 102.

As represented by block 1004, the access point 102 sends a request to the network (e.g., one or more network nodes 110) to authenticate the access terminal 108. Here, the network node(s) 110 may comprise a mobility management entity ("MME") or some other suitable network entity or entities. The access point 102 also may send an identifier (e.g., a CSG ID associated with the access point 102) to the network node 110 in conjunction with the request (e.g., included in the request message). In addition, the request may include information received from the access terminal 108 (e.g., at block 1002).

As represented by block 1006, the network node 110 obtains context information associated with the access terminal 108 (e.g., from a prior MME for the access terminal 108 or from the HSS). This context information may include, for example, a set of identifiers associated with the access terminal 108. For example, the context information may include a list of all CSG IDs associated with the access terminal 108. In some implementations, the network node 110 may maintain its own list of CSG IDs for each of its restricted access points. In this case, the network node 110 may update its list whenever an entry is changed at the webserver.

As represented by block 1008, the network node 110 determines whether the access terminal 108 is allowed to access the access point 102. For example, the network node 110 determines whether an identifier of the access point 102 (e.g., indicative of a CSG to which the access point 102 belongs) is on a list of identifiers associated with the access terminal 108 (e.g., indicative of all of the CSGs to which the access terminal 108 belongs).

The determination of block 1008 may be made at various network nodes. For example, in some implementations this determination may be made at an MME that obtains and/or maintains the identifiers associated with the access point 102 and the access terminal 108.

In some implementations this determination may be made at another network node such as an HSS. For example, the MME may send a request to the HSS to determine whether the access terminal 108 is authorized to access the access point 102. In conjunction with such a request, the MME may send information (e.g., identifiers such as an IMSI and a CSG ID) to the HSS in some cases. Also, in some cases the HSS may obtain and maintain such information on its own. After determining whether access is allowed, the HSS sends a corresponding response back to the MME.

As represented by block 1010, the MME sends a response to the access point 102 based on the MME's determination or based on the determination of another network node (e.g., an HSS). Based on this response, the access point 102 may then either allow or deny access by the access point 108.

Figure 11:
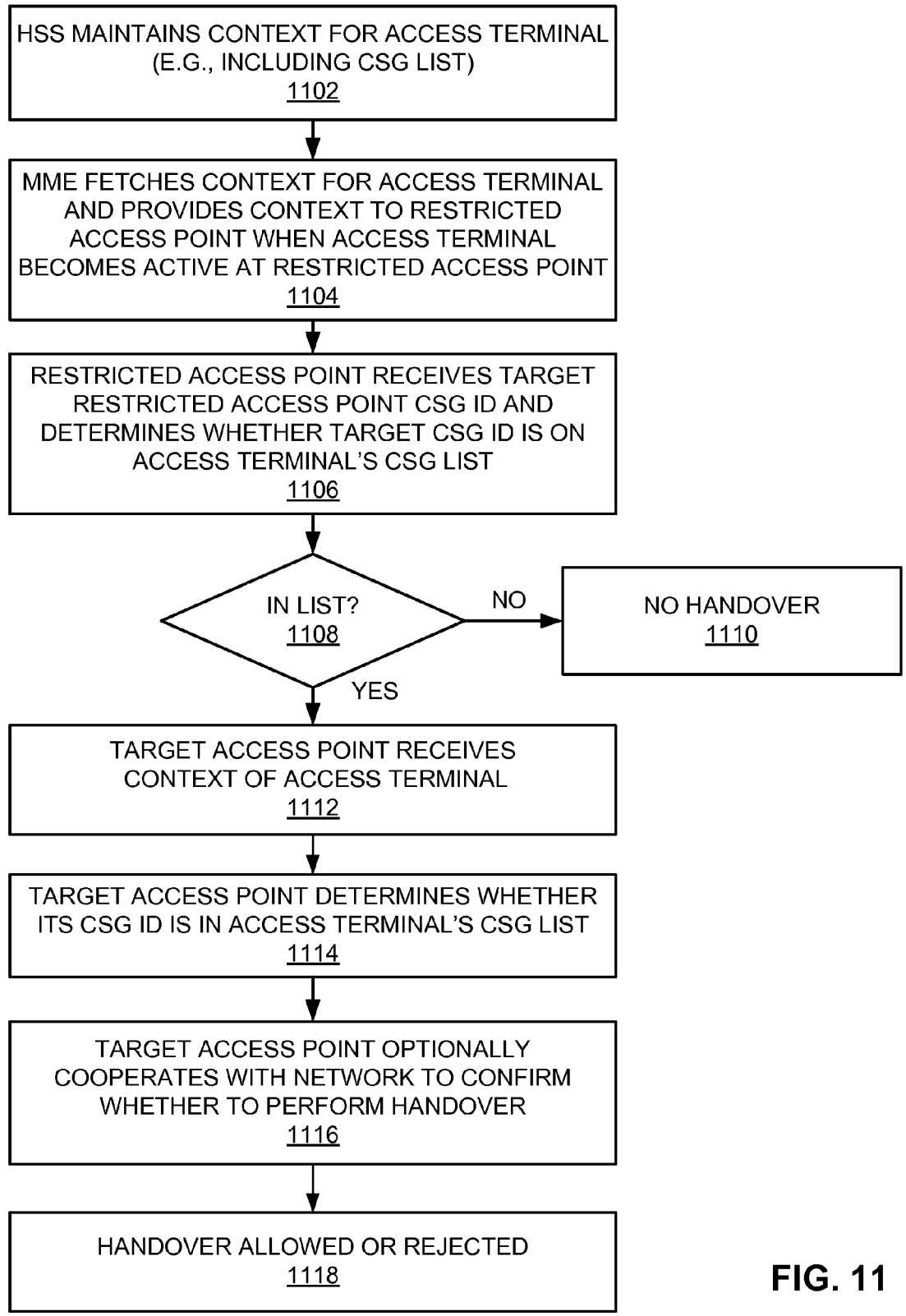
FIG. 11 is a flowchart of several sample aspects of operations that may be employed to provide access control.

FIG. 11 illustrates operations that may be employed in conjunction with a handover operation. For example, the access terminal 108 may initially be served by the access point 104 and, at a later point in time, the access terminal 108 is handed over to the access point 102 and then served by that node.

As represented by block 1102, the network (e.g., an HSS) may maintain context information for each access terminal in the system. As mentioned above, this context information may include a list (e.g., a whitelist) indicative of all of the access sets (e.g., CSGs) to which the access terminal 108 belongs.

As represented by block 1104, the network (e.g., an MME) fetches the context for given access terminal and provides the context to a restricted access point when that access terminal becomes active at the restricted access point. Referring to the example of FIG. 3, when the access terminal 108 becomes active (e.g., is turned on) at the access point 104, the network node 110 may send the context information for the access terminal 108 to the access point 104. In this way, the access terminal 108 may initially be served by the access point 104.

As represented by block 1106, at some point in time the access terminal 108 may be handed over to the access point 102. For example, if the access terminal 108 moves away from the access point 104, the measurement reports from the access terminal 108 may indicate that the signal strength of signals being received from the access point 102 is now higher than the signal strength of the signals received from the access point 104. In this case, the network may initiate a handover from the access point 104 to the access point 102.

As represented by blocks 1106 and 1108, in conjunction with this handover, the access point 104 (i.e., the source access point) may receive an identifier associated with the target access point (i.e., the access point 102) such as, for example, a CSG ID. For example, this information may be received from the access terminal 108. The access point 104 may then determine whether the access terminal 108 is authorized to access the access point 102 based on this identifier. For example, the access point 104 may compare the identifier with a list that specifies the access points that the access terminal 108 is allowed to access (e.g., a whitelist such as a CSG ID list from the context information for the access terminal 108).

As represented by block 1110, if the access terminal 108 is not authorized to access the access point 102 (e.g., the CSG ID of the access point 102 is not in the CSG ID list of the access terminal 108), the handover operation may not be performed. For example, the access point 102 may send a message to the network node 110 to terminate the handover operation. In addition or alternatively, the access point 102 may send a rejection and/or redirection message to the access point 108 (e.g., as discussed above).

As represented by block 1112, the handover operation may proceed if the access terminal 108 is authorized to access the access point 102 (e.g., the CSG ID of the access point 102 is in the CSG ID list of the access terminal 108). Accordingly, the network (e.g., the MME) may send the context information for the access terminal 108 to the access point 102 or the access point 102 may receive this information from the access point 104.

As represented by block 1114, the access point 102 may determine whether the access terminal 108 is authorized to access the access point 102. For example, in a similar manner as discussed above, the access point 102 may compare its identifier (e.g., a CSG ID) with a list that specifies the access points that the access terminal 108 is allowed to access (e.g., a CSG ID list from the context information for the access terminal 108).

As represented by block 1116, in some implementations the access point 102 may send a request to the network (e.g., the MME) to confirm whether the handover should be performed (e.g., in conjunction with a path switch request). For example, as discussed above the access point 102 may send a request (e.g., optionally including an identifier associated with the access terminal 108 and the CSG ID for the access point, if needed) to the network node 110 to determine whether the access terminal 108 should be allowed access to the access point 102.

In situations where an access terminal needs to access the target access point without prior handover preparation (e.g., during a radio link failure), a target access point may fetch the access terminal context from the source access point. As mentioned above, this context includes a CSG list of the access terminal. Thus, the target access point may determine whether the access terminal is allowed to access the target access point.

As represented by block 1118, based on the determination at block 1114 (and optionally block 1116), the handoff is either allowed or rejected. If the handover is allowed, the access point 102 then becomes the serving access point for the access terminal 108. Conversely, if the handover is not allowed, the handover may be terminated (e.g., as discussed above conjunction with block 1110).

Figure 12:
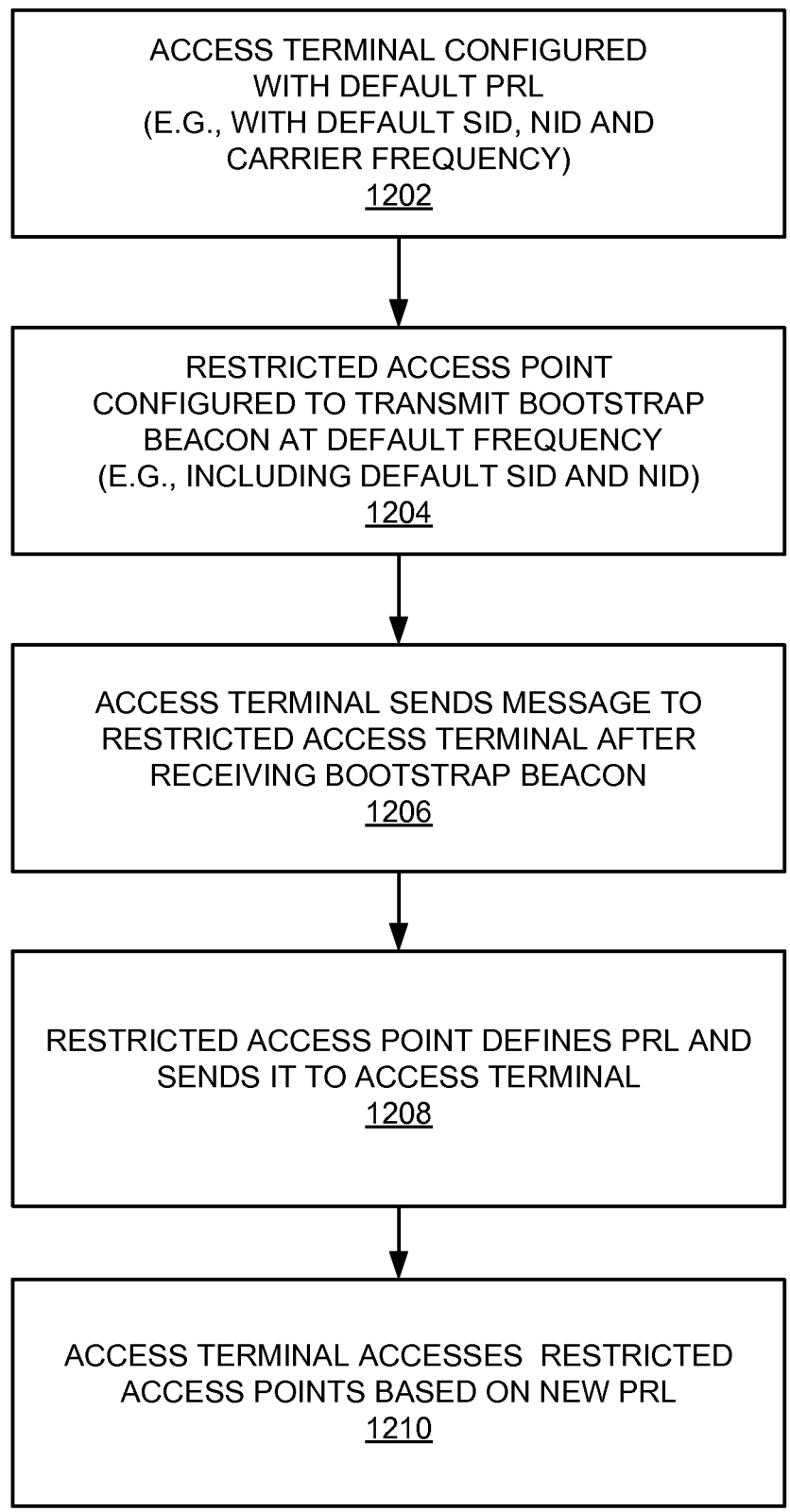
FIG. 12 is a flowchart of several sample aspects of operations that may be employed to provision an access terminal.

Referring now to FIG. 12, in some implementations a restricted access point may be used to provision an access terminal. For illustration purposes the examples that follow describe examples where an access terminal is provisioned (e.g., configured) with a preferred roaming list ("PRL"). It should be appreciated, however, that an access terminal may be provisioned with other types of information in accordance with the teachings herein.

As represented by block 1202, access terminals in a network (e.g., any access terminals that may access a restricted access point) may originally be configured with a default PRL (e.g., the list comprises or specifies a default configuration). For example, the access terminal 106 may be configured by the network operator when the access terminal 106 is purchased by a user. Such a PRL may specify, for example, a default system identifier ("SID"), a default network identifier ("NID"), and a default frequency for initial acquisition of any restricted access points that may be deployed in the network. Here, all of the above access terminals may be configured with the default PRL. In this way, each access terminal may locate and access a restricted access point for provisioning operations. In some aspects the default PRL information (e.g., SID and/or NID) may correspond to one or more access points associated with a highest priority. For example, the access terminal may be configured to search (e.g., search first) for a specified preferred access point or specified preferred access points (e.g., home access points).

In some aspects, the parameters of the default PRL may be reserved for restricted access point-related operations. For example, the default SID may be reserved for restricted access points by the network operator. Through the use of such an SID, access terminals that are not configured to access restricted access points (e.g., access terminals configured only for use on a macro network) may be prevented from attempting registration with restricted access points. In addition, the default NID may be reserved for restricted access point-related initialization procedures. Also, the default frequency may be defined as a common frequency to be used by the restricted access points in the network for transmitting beacons for provisioning procedures. In some cases, the default frequency may be the same as a macro access point's operating frequency or an operating frequency of a restricted access point.

The default PRL may also include information for macro system selection. For example, the default PRL may include identifiers and frequencies that may be used to access macro access points in the network.

As represented by block 1204, restricted access points in the system (e.g., access point 102) are configured to transmit a bootstrap beacon. In some aspects this bootstrap beacon may comprise a temporary beacon that is used in conjunction with provisioning provided by the access point 102. Here, the bootstrap beacon may be broadcast in accordance with the generic PRL parameters discussed above (e.g., the beacon may comprise or specify a default configuration). For example, the bootstrap beacon (e.g., a default beacon) may be transmitted at the default frequency, and may include the default SID and the default NID (e.g., sent in overhead messages).

The bootstrap beacon may be transmitted at a very low power level that is much lower than the beacon transmit power during normal access point operations (e.g., when the access point is configured in a non-initialization operating mode such as a normal operating mode). For example, the bootstrap beacon transmit power may result in a coverage range (e.g., radius) for the bootstrap beacon on the order of one meter or less.

In some implementations the access point 102 may transmit bootstrap beacons when the access point is in a provisioning (e.g., configuration or initialization) mode. In some implementations, a user may use an input device to place the access point 102 in the configuration mode when the user wishes to initially provision or re-provision the access terminal 106. For example, an access terminal may be provisioned when an access point is first installed, when an access terminal is initially purchased, or when the PRL of an access terminal was updated by a macro network (e.g., in conjunction with a change in the roaming list, international travel, and so on) that resulted in the PRL that was provisioned by the access point (as discussed below) being overwritten.

As represented by block 1206, when the access terminal 106 provisioned with the default PRL is placed near the restricted access point 102 operating in a provisioning mode, the access terminal 106 may receive the bootstrap beacon transmitted by the access point 102. In response, the access terminal 106 may send a message to the access point 102 to initiate provisioning operations. In some implementations, this message may include the PRL currently used by the access terminal 106. In some implementations a user of the access terminal 106 may initiate provisioning by selecting an appropriate feature at access terminal (e.g., dialing a defined number).

As represented by block 1208, the access point 102 (e.g., the provisioning controller 328) may define a new PRL for the access terminal 106 (e.g., for normal mobile operations). The new PRL may include macro system information as in the default PRL, but the default PRL initialization information may be removed. In its place, new PRL information may be added (e.g., the list comprises or specifies a new configuration). In some aspects the new PRL information may be specific to the access point 102 (e.g., the new PRL may be different than the PRL provisioned by other access points). For example, a new PRL may specify the SID that is reserved for all restricted access points as discussed above, an NID that is unique to the access point 102 (e.g., a femto NID, "FNID"), and a frequency parameter that indicates the operating frequency of the access point 102. This frequency parameter may be the same or different than the default frequency. In some aspects the new PRL information (e.g., SID and/or NID) may correspond to one or more access points associated with a highest priority. For example, the access terminal 106 may be configured to search (e.g., search first) for a specified preferred access point or specified preferred access points (e.g., home access points).

The access point 102 may obtain macro system PRL information in various ways. In some implementations the access point 102 may request this PRL information from the macro access point (e.g., via network node 110 or over-the-air). In some implementations the access point 102 may receive this PRL information from an access terminal (e.g., the access terminal 108). For example, the access point 102 may include an over-the-air function. Here, the access point 102 may send a message (e.g., an SSPR configuration request) to request the access terminal's current PRL (which may include the current macro PRL information as discussed above) and the access terminal may respond by sending its current PRL over-the-air to the access point 102.

Once the access point 102 defines a new PRL, the access point 102 sends (e.g. pushes) the PRL to the access terminal 106. For example, the access point 102 may send a PRL to the access terminal over-the-air (e.g., via OTASP or OTAPA).

Advantageously, by provisioning the access terminal 106 via the access point 102 as discussed above, the network operator need not maintain access terminal-specific information (e.g., PRL information). It may be desirable, however, to configure the access point 102 so that it does regular updates to the access terminal's PRL. For example, the PRL may be updated every evening and sent to the access terminal 106 over-the-air. In addition, to prevent one access point of a set of related access points from overwriting PRL information provision by another access point of the set, each access point may be configured to simply update the access terminal's current PRL information. For example, the access point 102 may query the access terminal 106 for its current PRL information, whereby the access point 102 will add its own PRL system information to the current PRL of the access terminal 106, rather than overwriting the current PRL information.

As represented by block 1210, once the access terminal 106 is provisioned with the new PRL information, the access terminal 106 will use this information to identify access points it may access. For example, in the event the access terminal 106 determines that the access point 102 is in the vicinity (e.g., after the access point has been configured to a normal operating mode), the access terminal 106 may give preference to being served by the access point 102 as opposed to any other access points (e.g., a macro access point) that are detected by the access terminal 106.

Figure 13:
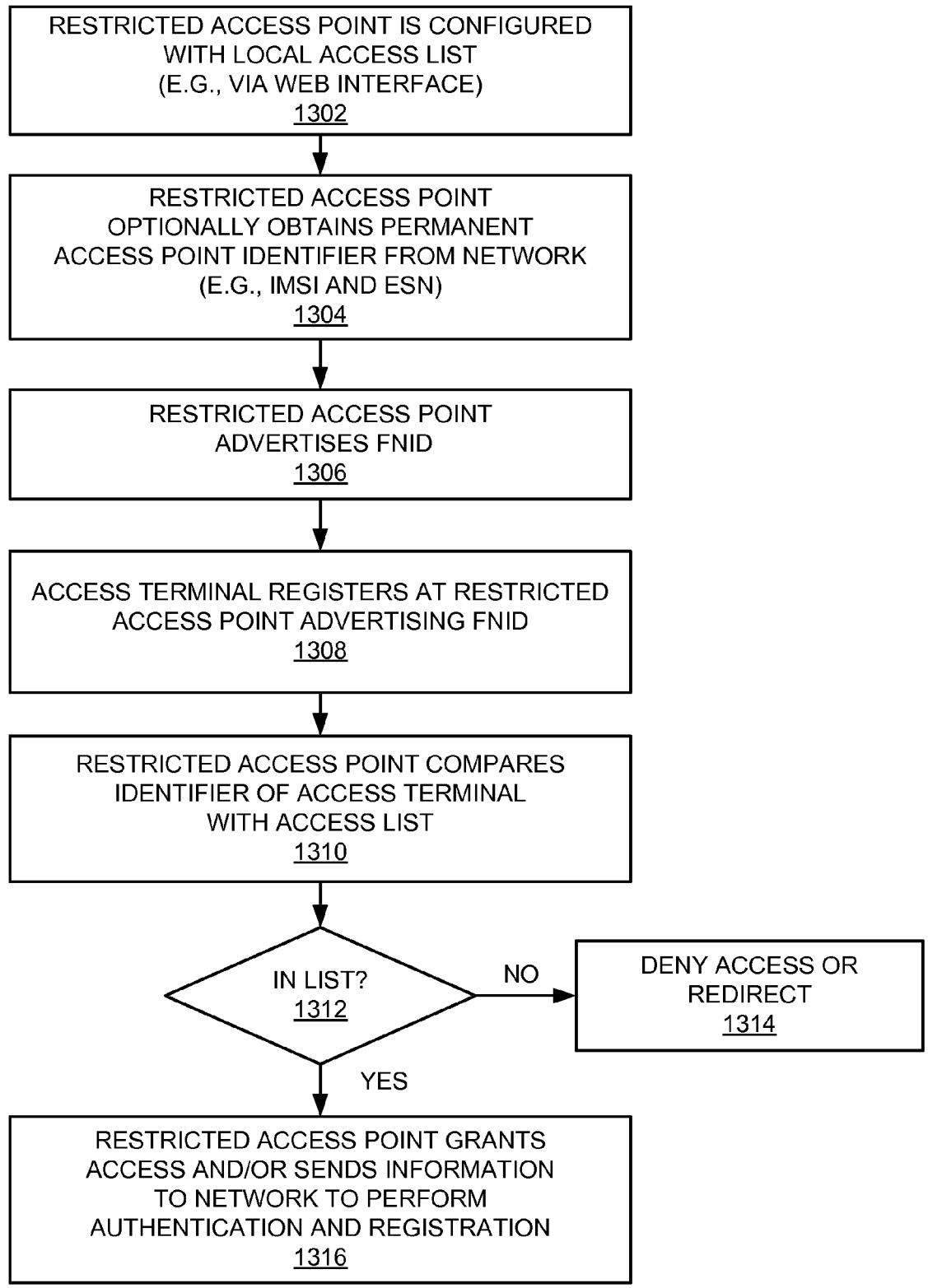
FIG. 13 is a flowchart of several sample aspects of operations that may be employed to provide access control.

Referring now to FIG. 13, various techniques are described for controlling restricted access (e.g., association) at an access point. In this example, an access point may be configured with a local list of access terminals that are allowed to access one or more services provided by the access point. The access point may then grant or deny access based on the local list. Advantageously, in some aspects such a scheme may enable the owner of an access point to give temporary service to guest access terminals (e.g., by adding/deleting these access terminals to/from the list) without involving a network operator.

As represented by block 1302, a restricted access point (e.g., access point 102) is configured with an access list (e.g., represented by local access list 340 in FIG. 3). For example, the owner of access point 102 may configure a list of identifiers (e.g., phone numbers) of access terminals that are allowed to use one or more services provided by the access point 102. In some implementations, control over which access terminals may access the access point 102 may thus rest with the owner of the access point 102 rather than a network operator.

The access point 102 may be provisioned in various ways. For example, the owner may use a web interface hosted by the access point 102 to configure the access point 102.

In addition, different access terminals may be given different levels of access. For example, guest access terminals may be given temporary access based on various criteria. Also, in some implementations a home access terminal may be assigned better quality of service than a guest access terminal. In addition, some access terminals (e.g., guest access terminals) may be given access to certain services (e.g., local services such as a multimedia server or some other type of information server) without involving authentication by a network operator. Also, in some cases the local access list 340 may be used as an initial stop gap at the access point 102, whereby actual authentication (e.g., for a telephone call) may be performed by the network to prevent the security of the network from being compromised.

As represented by block 1304, the access point 102 may send the access terminal identifier information that was configured at block 1302 (e.g., the local access list 340) to a network database (e.g., authentication center/home location register, "AC/HLR") and request other identification information associated with the corresponding access terminals. For example, the access point 102 may send a phone number of the access terminal 106 to the network node 110 (e.g., comprising an HLR database) and receive an electronic serial number ("ESN") or an international mobile subscriber identity ("IMSI") that is assigned to the access terminal 106 from the network node 110.

As represented by block 1306, the access point 102 may advertise its identification information (e.g., as discussed herein). For example, the access point 102 may advertise SID and FNID information as discussed above.

As represented by block 1308, an access terminal that is provisioned to access the access point 102 may determine that it is in the vicinity of the access point 102 upon receiving the advertised identification information. For example, the access terminal 106 may be provisioned with a PRL by the access point 102 as discussed above, or the access terminal 106 may be provisioned with a PRL that includes the restricted access point SID, a wildcard NID, and one or more operating frequencies that are used by the access point 102, or the access terminal 106 may be provisioned in some other manner that enables it to identify the access point 102 (e.g., provisioned with a preferred user zone list). The access terminal 106 may then attempt to register with the access point 102 as a result of receiving a different SID (e.g., which may represent a different zone than the macro zone for zone-based registration). Thus, in some cases the access terminal may automatically attempt to access the access point 102. In other cases, however, a user may control whether the access terminal 106 accesses the access point 102 (e.g., the user provides input via an input device in response to an indication of detected access points output by the access terminal 106). In conjunction with this registration, the access terminal 106 may send its identifier (e.g., its ESN, IMSI, etc.) to the access point 102 (e.g., via an access channel).

As represented by blocks 1310 and 1312, the access point 102 determines whether the access terminal 106 is allowed to access the access point 102. For example, the access point 102 may determine whether the identifier received from the access terminal 106 is listed in the local access list 340. It should be appreciated that authentication information other than ESNs and IMSIs may be used in different implementations. For example, the access point 102 may receive call origination number information via idle messages and use this information for authentication (e.g., to be compared with a caller number received from the access terminal 106 via a registration message or in some other way).

As represented by block 1314, if the access terminal 106 is not allowed access (e.g., the received access terminal identifier is not in the local access list 340), the access point 102 may deny access. For example, the access point 102 may send a registration reject message to the access terminal 106. In addition or in the alternative, the access point 102 may send a service redirection message to the access terminal 106. This message may include, for example, information (e.g., SID, NID, operating frequency) that identifies an alternative access point (e.g., a local macro network) that the access terminal 106 may access.

As represented by block 1316, if the access terminal 106 is allowed access (e.g., the received access terminal identifier is in the local access list 340), the access point 102 may grant access to certain services. For example, as discussed above, the access point 102 may grant access to local services provided by a local network.

In addition or alternatively, the access point 102 may pass the registration information to the network node 110 (e.g., the macro network's HRL) for authentication and registration of the access terminal 106. The network node 110 may then respond with a registration accept or reject message. In response, the access point 102 may send a corresponding message to the access terminal 106. If authorized, the access point 106 then obtains the request service from the access point 102 (e.g., network access).

It should be appreciated that the above techniques may be implemented in various ways in accordance with the teachings here. For example, authentication information that is different than the information specifically mentioned above (e.g., ESNs, IMSIs, CSG IDs) may be used in an apparatus or method practiced based on the teachings herein.

In some aspects the teachings herein may be employed in a network that includes macro scale coverage (e.g., a large area cellular network such as a 3G network, typically referred to as a macro cell network or a WAN) and smaller scale coverage (e.g., a residence-based or building-based network environment, typically referred to as LAN). As an access terminal moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each node may be associated with (e.g., divided into) one or more cells or sectors.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB, Home eNodeB, access point base station, femto cell, and so on.

Figure 14:
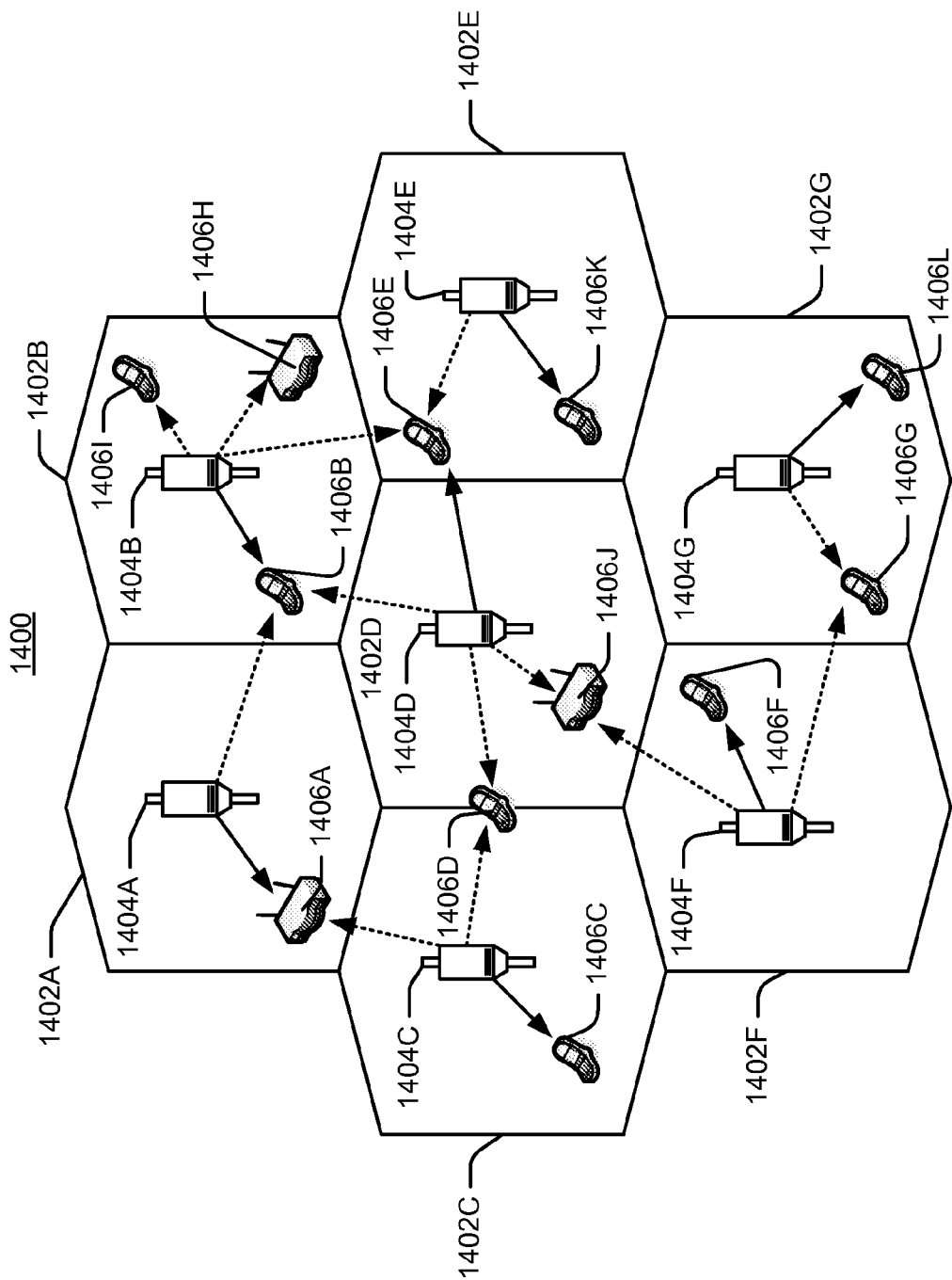
FIG. 14 is a simplified diagram of a wireless communication system.

FIG. 14 illustrates a wireless communication system 1400, configured to support a number of users, in which the teachings herein may be implemented. The system 1400 provides communication for multiple cells 1402, such as, for example, macro cells 1402A-1402G, with each cell being serviced by a corresponding access point 1404 (e.g., access points 1404A-1404G). As shown in FIG. 14, access terminals 1406 (e.g., access terminals 1406A-1406L) may be dispersed at various locations throughout the system over time. Each access terminal 1406 may communicate with one or more access points 1404 on a forward link ("FL") and/or a reverse link ("RL") at a given moment, depending upon whether the access terminal 1406 is active and whether it is in soft handoff, for example. The wireless communication system 1400 may provide service over a large geographic region. For example, macro cells 1402A-1402G may cover a few blocks in a neighborhood or several miles in rural environment.

Figure 15:
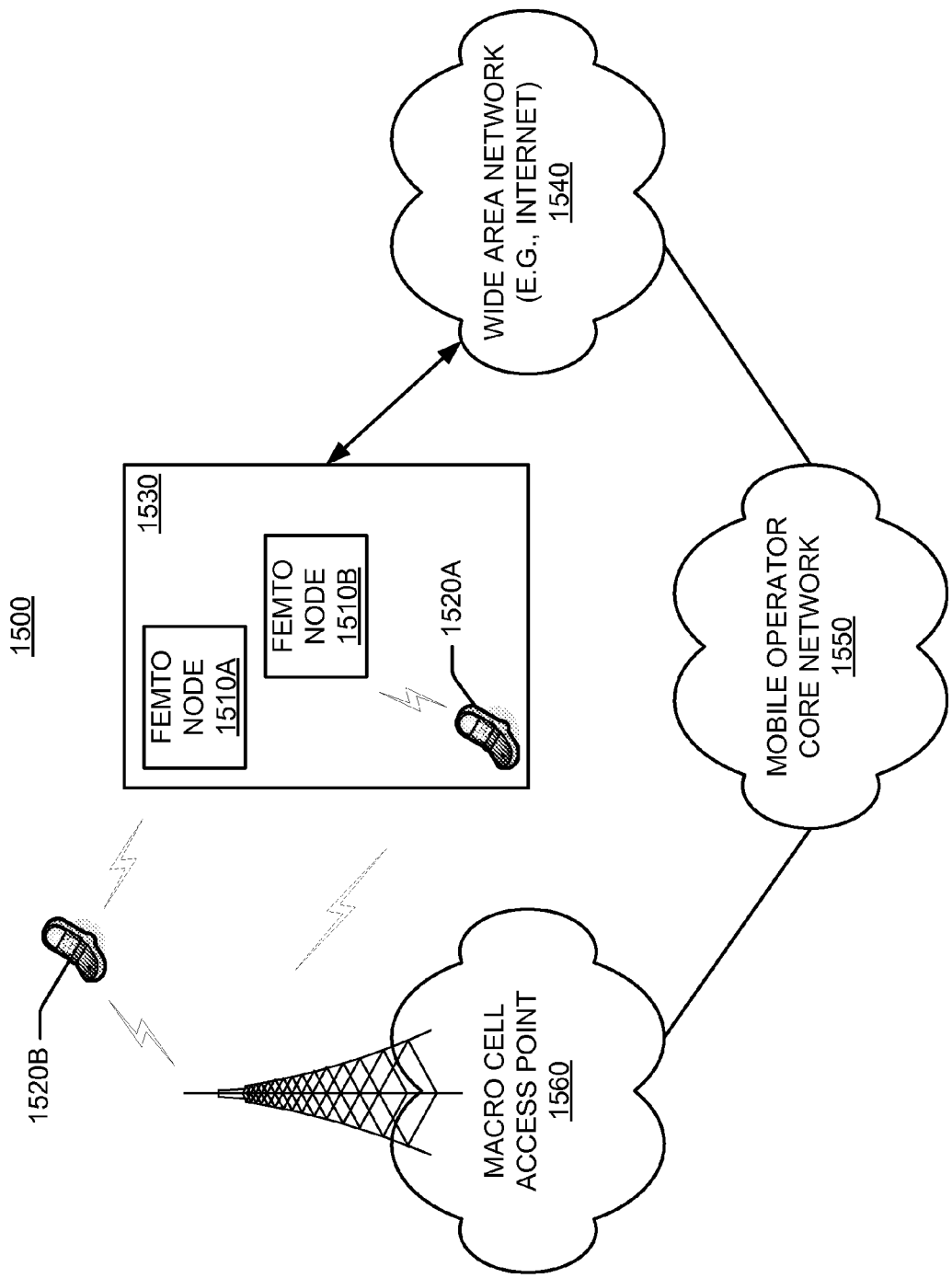
FIG. 15 is a simplified diagram of a wireless communication system including femto nodes.

FIG. 15 illustrates an exemplary communication system 1500 where one or more femto nodes are deployed within a network environment. Specifically, the system 1500 includes multiple femto nodes 1510 (e.g., femto nodes 1510A and 1510B) installed in a relatively small scale network environment (e.g., in one or more user residences 1530). Each femto node 1510 may be coupled to a wide area network 1540 (e.g., the Internet) and a mobile operator core network 1550 via a DSL router, a cable modem, a wireless link, or other connectivity means (not shown). As will be discussed below, each femto node 1510 may be configured to serve associated access terminals 1520 (e.g., access terminal 1520A) and, optionally, alien access terminals 1520 (e.g., access terminal 1520B). In other words, access to femto nodes 1510 may be restricted whereby a given access terminal 1520 may be served by a set of designated (e.g., home) femto node(s) 1510 but may not be served by any non-designated femto nodes 1510 (e.g., a neighbor's femto node 1510).

Figure 16:
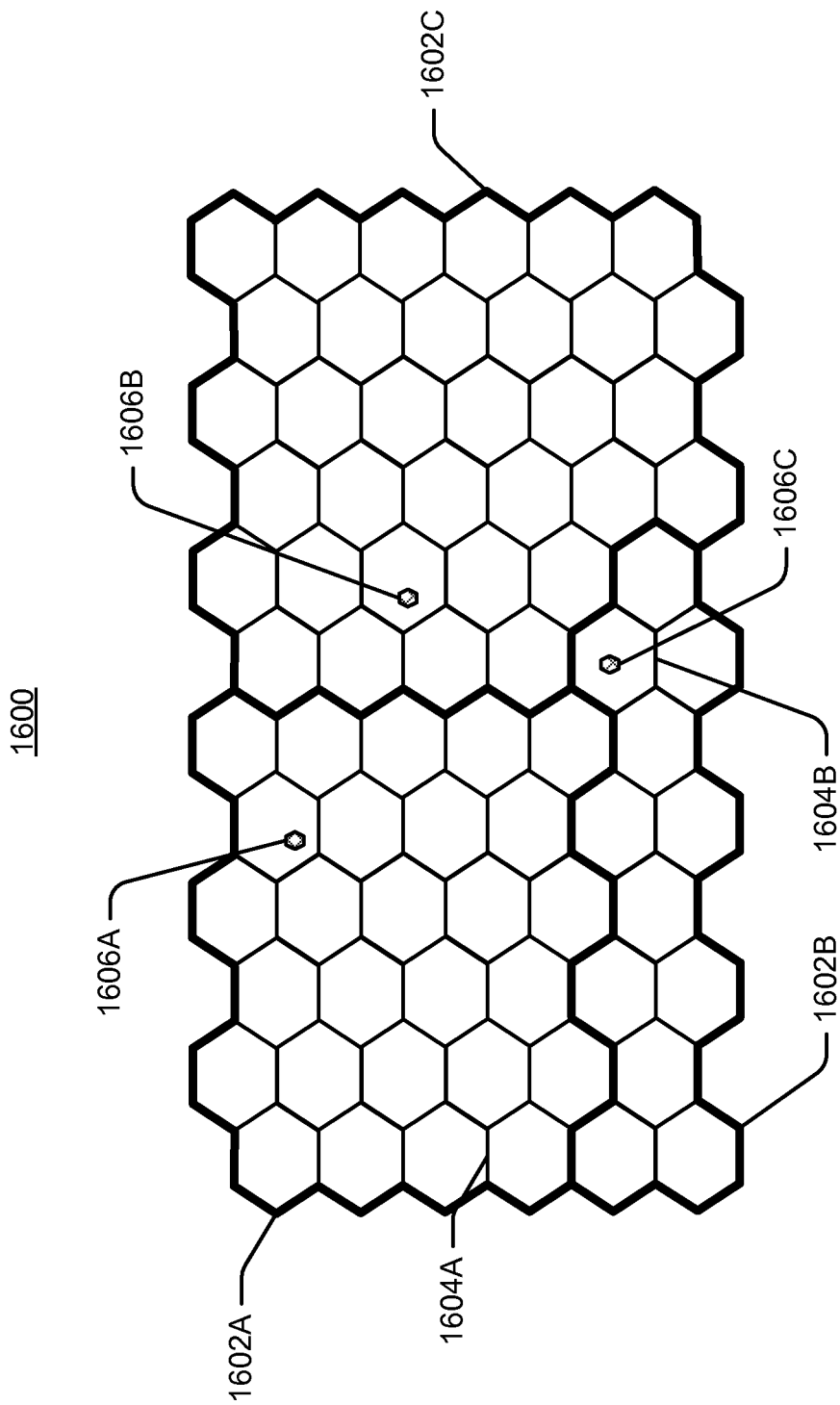
FIG. 16 is a simplified diagram illustrating coverage areas for wireless communication.

FIG. 16 illustrates an example of a coverage map 1600 where several tracking areas 1602 (or routing areas or location areas) are defined, each of which includes several macro coverage areas 1604. Here, areas of coverage associated with tracking areas 1602A, 1602B, and 1602C are delineated by the wide lines and the macro coverage areas 1604 are represented by the hexagons. The tracking areas 1602 also include femto coverage areas 1606. In this example, each of the femto coverage areas 1606 (e.g., femto coverage area 1606C) is depicted within a macro coverage area 1604 (e.g., macro coverage area 1604B). It should be appreciated, however, that a femto coverage area 1606 may not lie entirely within a macro coverage area 1604. In practice, a large number of femto coverage areas 1606 may be defined with a given tracking area 1602 or macro coverage area 1604. Also, one or more pico coverage areas (not shown) may be defined within a given tracking area 1602 or macro coverage area 1604.

Referring again to FIG. 15, the owner of a femto node 1510 may subscribe to mobile service, such as, for example, 3G mobile service, offered through the mobile operator core network 1550. In addition, an access terminal 1520 may be capable of operating both in macro environments and in smaller scale (e.g., residential) network environments. In other words, depending on the current location of the access terminal 1520, the access terminal 1520 may be served by a macro cell access point 1560 associated with the mobile operator core network 1550 or by any one of a set of femto nodes 1510 (e.g., the femto nodes 1510A and 1510B that reside within a corresponding user residence 1530). For example, when a subscriber is outside his home, he is served by a standard macro access point (e.g., access point 1560) and when the subscriber is at home, he is served by a femto node (e.g., node 1510A). Here, it should be appreciated that a femto node 1510 may be backward compatible with existing access terminals 1520.

A femto node 1510 may be deployed on a single frequency or, in the alternative, on multiple frequencies. Depending on the particular configuration, the single frequency or one or more of the multiple frequencies may overlap with one or more frequencies used by a macro access point (e.g., access point 1560).

In some aspects, an access terminal 1520 may be configured to connect to a preferred femto node (e.g., the home femto node of the access terminal 1520) whenever such connectivity is possible. For example, whenever the access terminal 1520 is within the user's residence 1530, it may be desired that the access terminal 1520 communicate only with the home femto node 1510.

In some aspects, if the access terminal 1520 operates within the macro cellular network 1550 but is not residing on its most preferred network (e.g., as defined in a preferred roaming list), the access terminal 1520 may continue to search for the most preferred network (e.g., the preferred femto node 1510) using a Better System Reselection ("BSR"), which may involve a periodic scanning of available systems to determine whether better systems are currently available, and subsequent efforts to associate with such preferred systems. With the acquisition entry, the access terminal 1520 may limit the search for specific band and channel. For example, the search for the most preferred system may be repeated periodically. Upon discovery of a preferred femto node 1510, the access terminal 1520 selects the femto node 1510 for camping within its coverage area.

A femto node may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 1510 that reside within the corresponding user residence 1530). In some implementations, a node may be restricted to not provide, for at least one node, at least one of: signaling, data access, registration, paging, or service.

In some aspects, a restricted femto node (which may also be referred to as a Closed Subscriber Group Home NodeB) is one that provides service to a restricted provisioned set of access terminals. This set may be temporarily or permanently extended as necessary. In some aspects, a closed subscriber group ("CSG") may be defined as the set of access points (e.g., femto nodes) that share a common access control list of access terminals. A restricted access point may include a CSG that allows multiple access terminals to connect to it. A single access terminal may have the ability connect to multiple restricted access points. A channel on which all femto nodes (or all restricted femto nodes) in a region operate may be referred to as a femto channel.

Various relationships may thus exist between a given femto node and a given access terminal. For example, from the perspective of an access terminal, an open femto node may refer to a femto node with no restricted association (e.g., the femto node allows access to any access terminal). A restricted femto node may refer to a femto node that is restricted in some manner (e.g., restricted for association and/or registration). A home femto node may refer to a femto node on which the access terminal is authorized to access and operate on (e.g., permanent access is provided for a defined set of one or more access terminals). A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that is authorized to access the restricted femto node (e.g., the access terminal has permanent access to the femto node). A guest access terminal may refer to an access terminal with temporary access to the restricted femto node (e.g., limited based on deadline, time of use, bytes, connection count, or some other criterion or criteria). An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionality in the context of a femto node. It should be appreciated, however, that a pico node may provide the same or similar functionality for a larger coverage area. For example, a pico node may be restricted, a home pico node may be defined for a given access terminal, and so on.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out ("MIMO") system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 17:
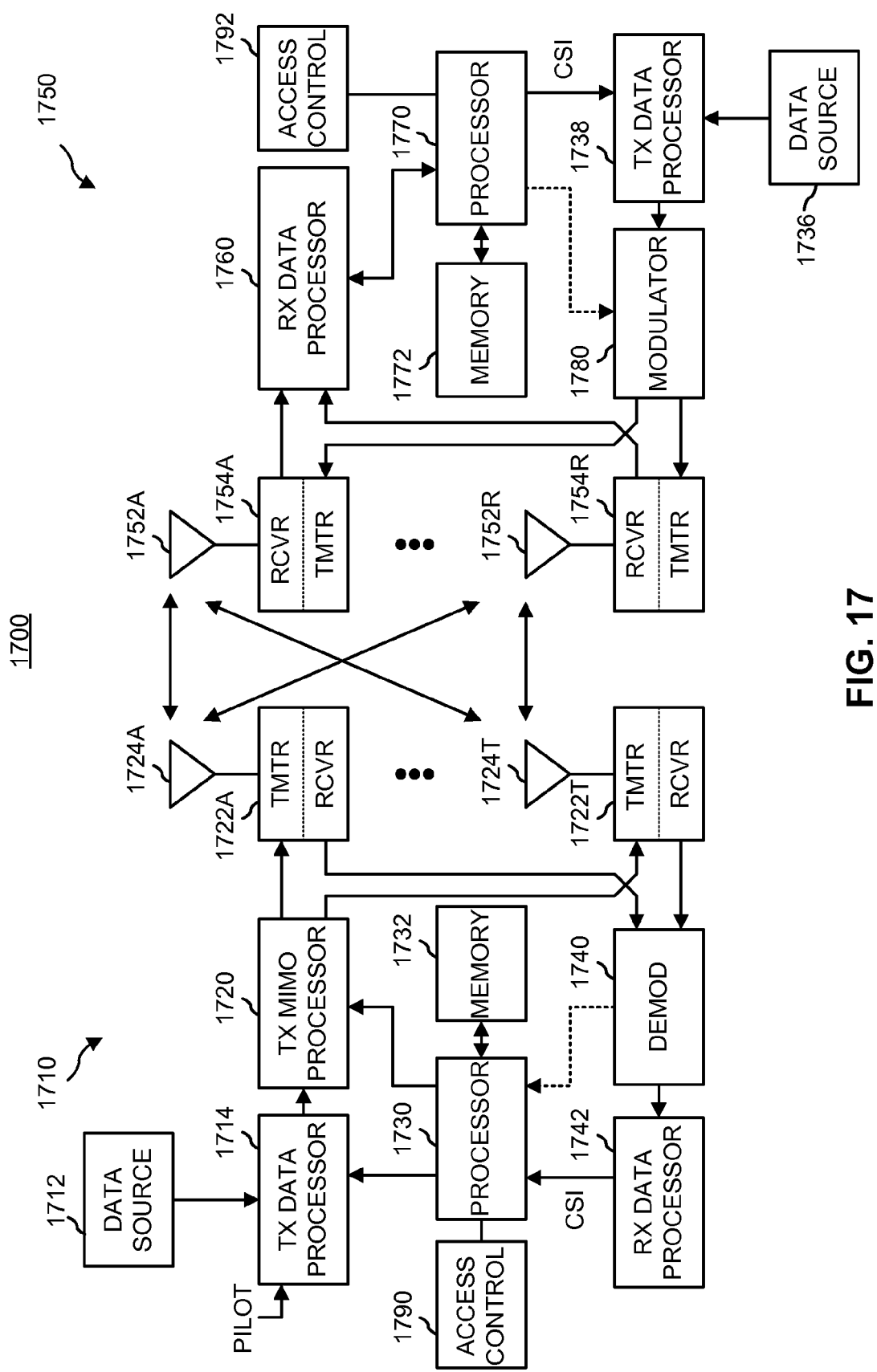
FIG. 17 is a simplified block diagram of several sample aspects of communication components.
Figure 18:
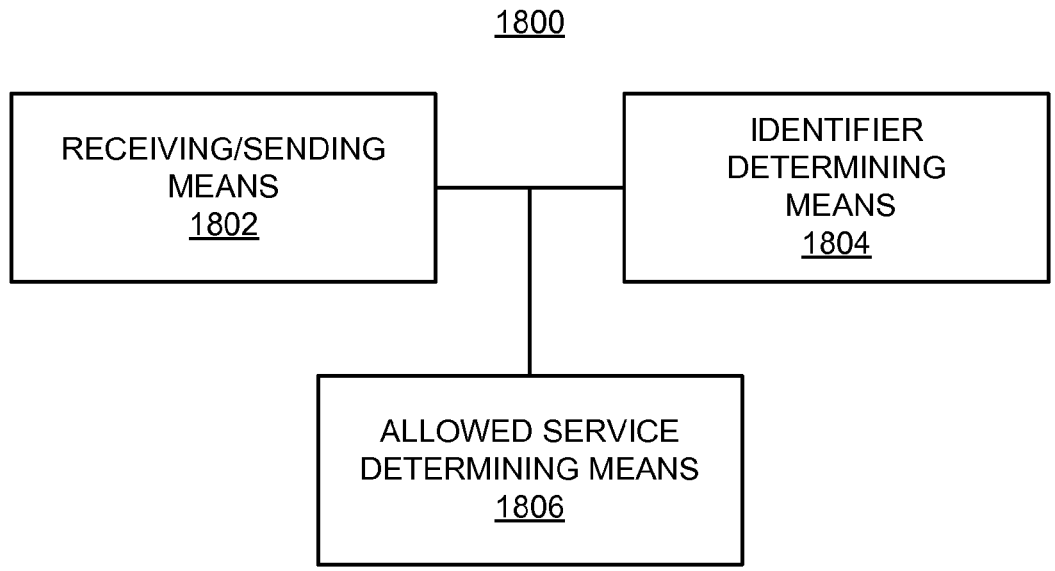
FIGS. 18-28 are simplified block diagrams of several sample aspects of apparatuses configured to provide provisioning and/or access management as taught herein.
Figure 19:
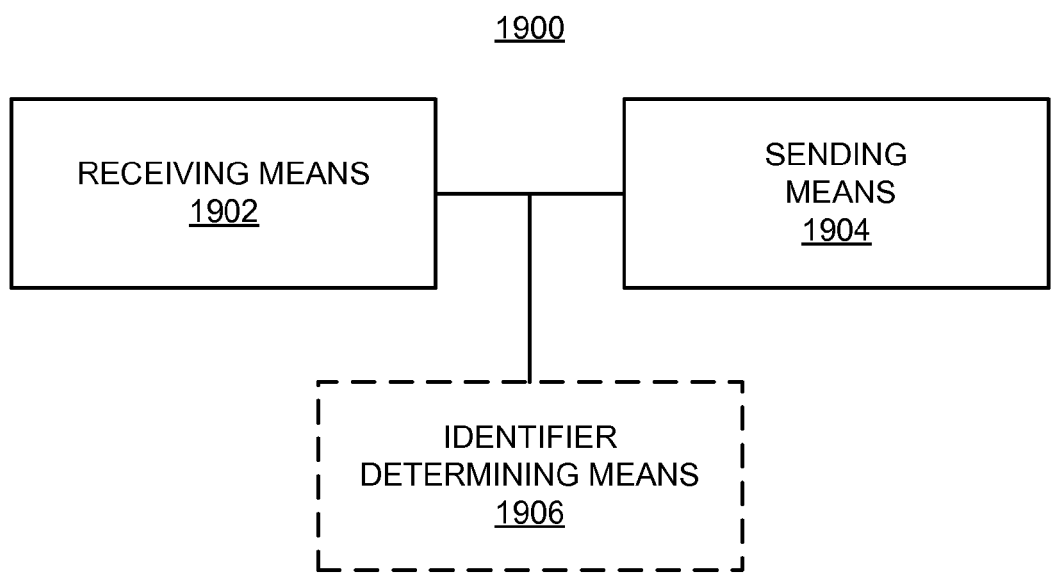
Figure 20:
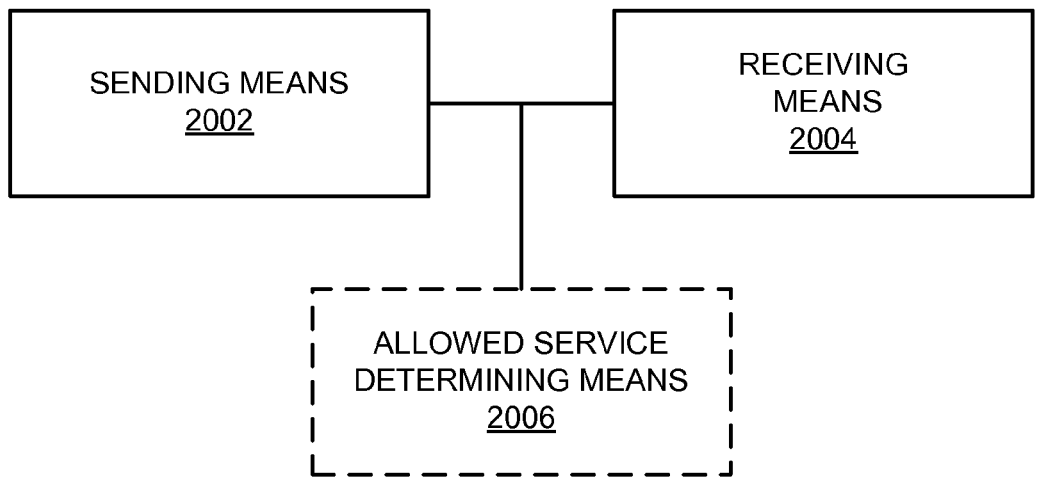
Figure 21:
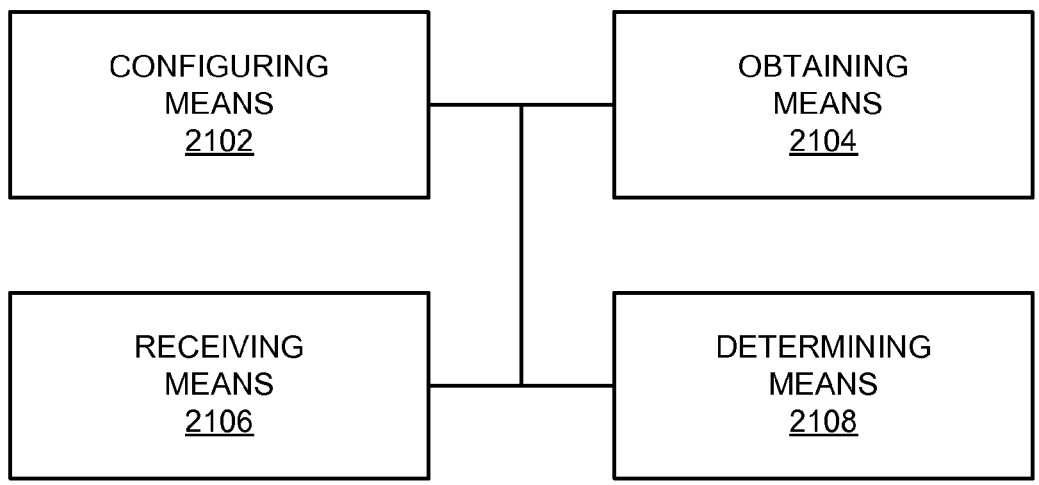
Figure 22:
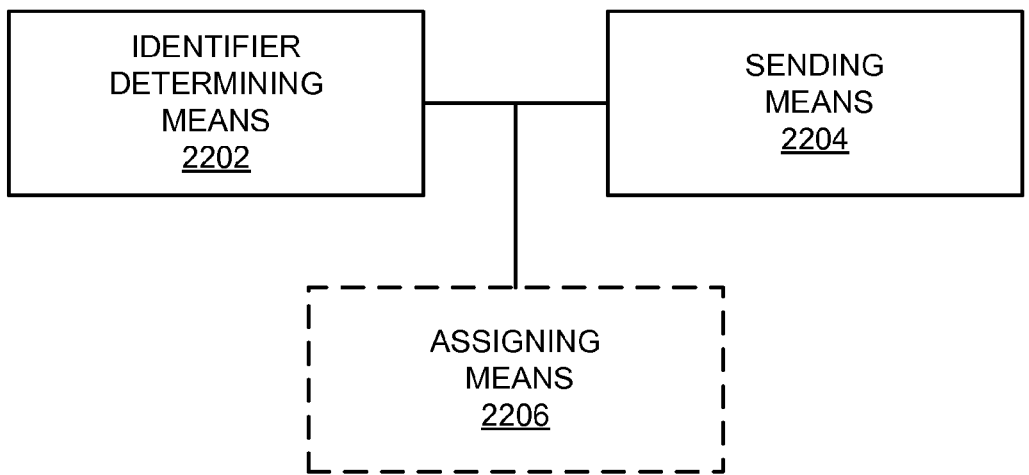
Figure 23:
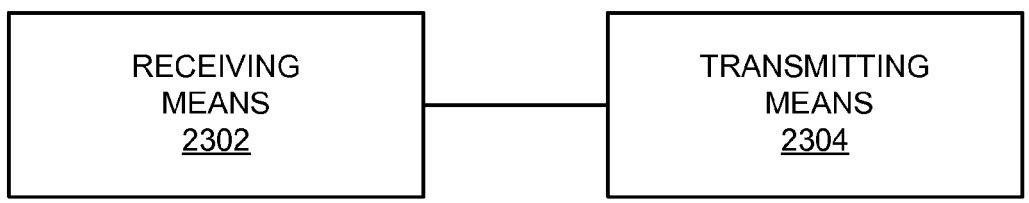
Figure 24:
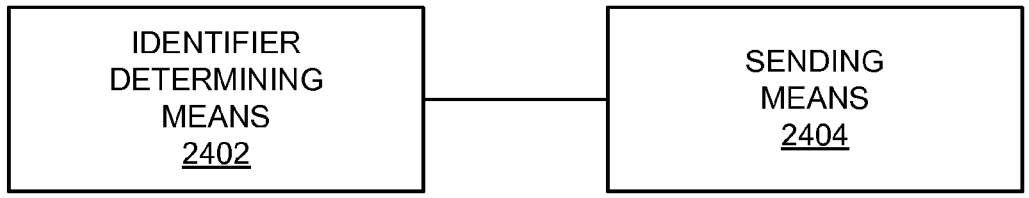
Figure 25:
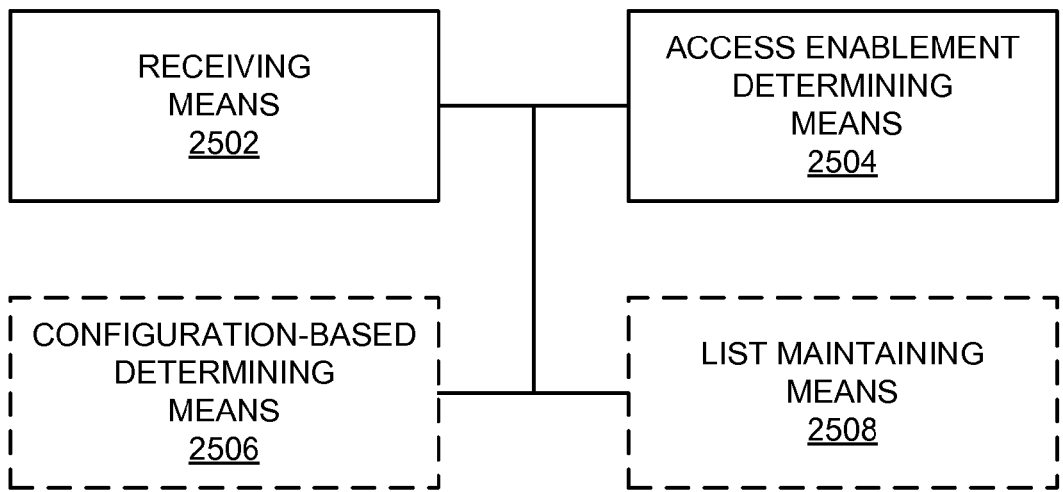
Figure 26:
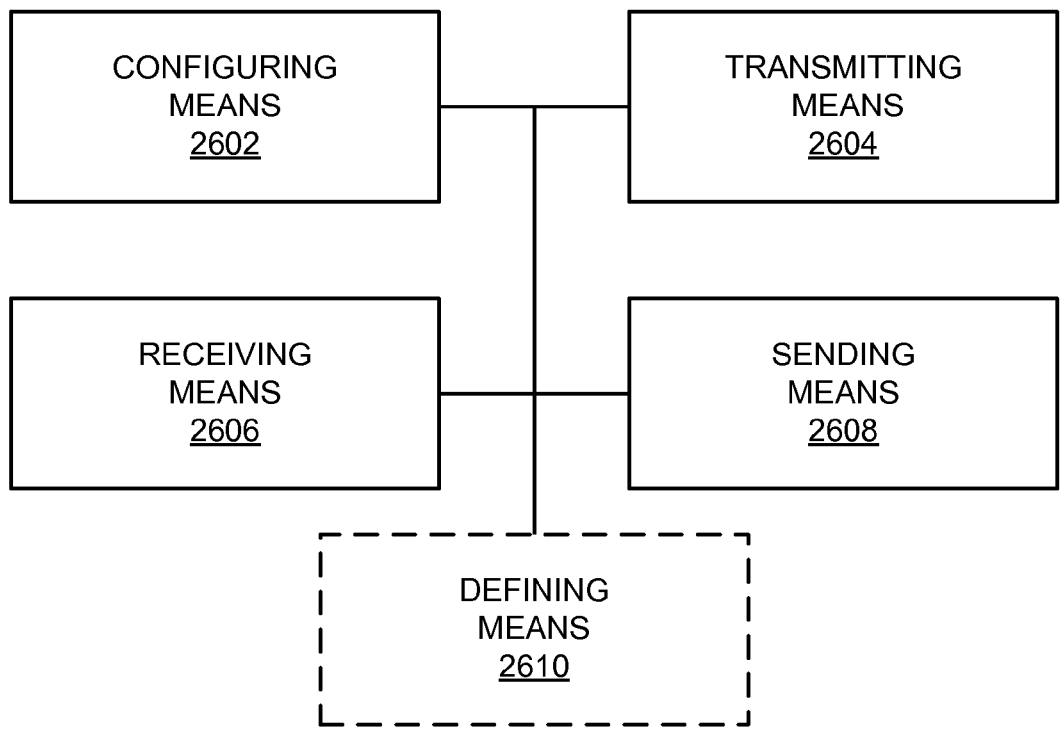
Figure 27:
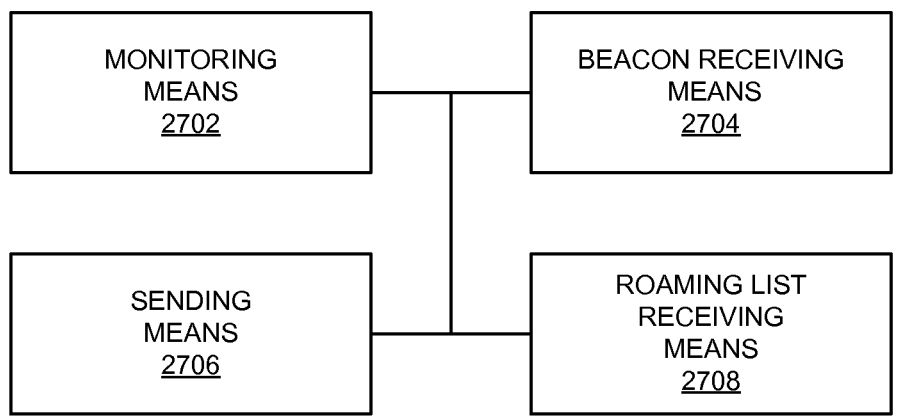
Figure 28:
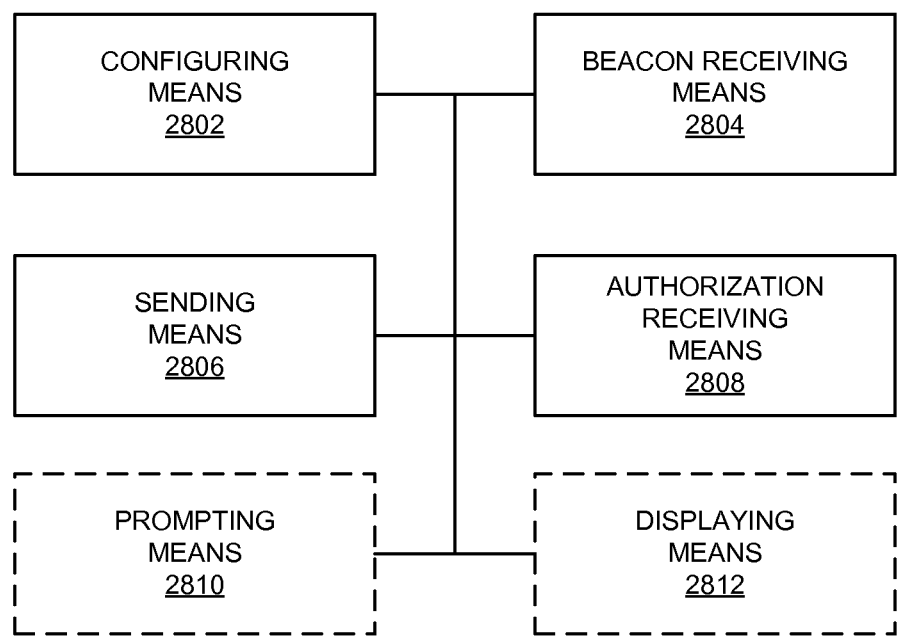

The teachings herein may be incorporated into a node (e.g., a device) employing various components for communicating with at least one other node. FIG. 17 depicts several sample components that may be employed to facilitate communication between nodes. Specifically, FIG. 17 illustrates a wireless device 1710 (e.g., an access point) and a wireless device 1750 (e.g., an access terminal) of a MIMO system 1700. At the device 1710, traffic data for a number of data streams is provided from a data source 1712 to a transmit ("TX") data processor 1714.

In some aspects, each data stream is transmitted over a respective transmit antenna. The TX data processor 1714 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1730. A data memory 1732 may store program code, data, and other information used by the processor 1730 or other components of the device 1710.

The modulation symbols for all data streams are then provided to a TX MIMO processor 1720, which may further process the modulation symbols (e.g., for OFDM). The TX MIMO processor 1720 then provides $N_T$ modulation symbol streams to NT transceivers ("XCVR") 1722A through 1722T. In some aspects, the TX MIMO processor 1720 applies beam-forming weights to the symbols of the data streams and to the antenna from which the symbol is being transmitted.

Each transceiver 1722 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1722A through 1722T are then transmitted from $N_T$ antennas 1724A through 1724T, respectively.

At the device 1750, the transmitted modulated signals are received by $N_R$ antennas 1752A through 1752R and the received signal from each antenna 1752 is provided to a respective transceiver ("XCVR") 1754A through 1754R. Each transceiver 1754 conditions (e.g., filters, amplifies, and downconverts) a respective received signal, digitizes the conditioned signal to provide samples, and further processes the samples to provide a corresponding "received" symbol stream.

A receive ("RX") data processor 1760 then receives and processes the $N_R$ received symbol streams from $N_R$ transceivers 1754 based on a particular receiver processing technique to provide $N_T$ "detected" symbol streams. The RX data processor 1760 then demodulates, deinterleaves, and decodes each detected symbol stream to recover the traffic data for the data stream. The processing by the RX data processor 1760 is complementary to that performed by the TX MIMO processor 1720 and the TX data processor 1714 at the device 1710.

A processor 1770 periodically determines which pre-coding matrix to use (discussed below). The processor 1770 formulates a reverse link message comprising a matrix index portion and a rank value portion. A data memory 1772 may store program code, data, and other information used by the processor 1770 or other components of the device 1750.

The reverse link message may comprise various types of information regarding the communication link and/or the received data stream. The reverse link message is then processed by a TX data processor 1738, which also receives traffic data for a number of data streams from a data source 1736, modulated by a modulator 1780, conditioned by the transceivers 1754A through 1754R, and transmitted back to the device 1710.

At the device 1710, the modulated signals from the device 1750 are received by the antennas 1724, conditioned by the transceivers 1722, demodulated by a demodulator ("DEMOD") 1740, and processed by a RX data processor 1742 to extract the reverse link message transmitted by the device 1750. The processor 1730 then determines which pre-coding matrix to use for determining the beam-forming weights then processes the extracted message.

FIG. 17 also illustrates that the communication components may include one or more components that perform access control operations as taught herein. For example, an access control component 1790 may cooperate with the processor 1730 and/or other components of the device 1710 to send/receive signals to/from another device (e.g., device 1750) as taught herein. Similarly, an access control component 1792 may cooperate with the processor 1770 and/or other components of the device 1750 to send/receive signals to/from another device (e.g., device 1710). It should be appreciated that for each device 1710 and 1750 the functionality of two or more of the described components may be provided by a single component. For example, a single processing component may provide the functionality of the access control component 1790 and the processor 1730 and a single processing component may provide the functionality of the access control component 1792 and the processor 1770.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access ("CDMA") systems, Multiple-Carrier CDMA ("MCCDMA"), Wideband CDMA ("W-CDMA"), High-Speed Packet Access ("HSPA," "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access ("UTRA)", cdma2000, or some other technology. UTRA includes W-CDMA and Low Chip Rate ("LCR"). The cdma2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11, IEEE 802.16, IEEE 802.20, Flash-OFDM®, etc. UTRA, E-UTRA, and GSM are part of Universal Mobile Telecommunication System ("UMTS"). The teachings herein may be implemented in a 3GPP Long Term Evolution ("LTE") system, an Ultra-Mobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Re199, Re15, Re16, Re17)

technology, as well as 3GPP2 (1×RTT, 1×EV-DO RelO, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller ("RNC"), a base station ("BS"), a radio base station ("RBS"), a base station controller ("BSC"), a base transceiver station ("BTS"), a transceiver function ("TF"), a radio transceiver, a radio router, a basic service set ("BSS"), an extended service set ("ESS"), or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The components described herein may be implemented in a variety of ways. Referring to FIGS. 18-28, apparatuses 1800, 1900, 2000, 2100, 2200, 2300, 2400, 2500, 2600, 2700, and 2800 are represented as a series of interrelated functional blocks. In some aspects the functionality of these blocks may be implemented as a processing system including one or more processor components. In some aspects the functionality of these blocks may be implemented using, for example, at least a portion of one or more integrated circuits (e.g., an ASIC). As discussed herein, an integrated circuit may include a processor, software, other related components, or some combination thereof. The functionality of these blocks also may be implemented in some other manner as taught herein. In some aspects one or more of the dashed blocks in FIGS. 18-28 are optional.

The apparatuses 1800, 1900, 2000, 2100, 2200, 2300, 2400, 2500, 2600, 2700, and 2800 may include one or more modules that may perform one or more of the functions described above with regard to various figures. For example, a receiving/sending means 1802 may correspond to, for example, a communication controller as discussed herein. An identifier determining means 1804 may correspond to, for example, an access controller as discussed herein. An allowed service determining means 1806 may correspond to, for example, an access controller as discussed herein. A receiving means 1902 may correspond to, for example, a communication controller as discussed herein. A sending means 1904 may correspond to, for example, an access controller as discussed herein. An identifier determining means 1906 may correspond to, for example, an access controller as discussed herein. A sending means 2002 may correspond to, for example, an access controller as discussed herein. A receiving means 2004 may correspond to, for example, a communication controller as discussed herein. An allowed service determining means 2006 may correspond to, for example, an access controller as discussed herein. A configuring means 2102 may correspond to, for example, an provisioning controller as discussed herein. An obtaining means 2104 may correspond to, for example, an access controller as discussed herein. A receiving means 2106 may correspond to, for example, a communication controller as discussed herein. A determining means 2108 may correspond to, for example, an access controller as discussed herein. An identifier determining means 2202 may correspond to, for example, an provisioning controller as discussed herein. A sending means 2204 may correspond to, for example, a communication controller as discussed herein. An assigning means 2206 may correspond to, for example, an provisioning controller as discussed herein. A receiving means 2302 may correspond to, for example, a provisioning controller as discussed herein. A transmitting means 2304 may correspond to, for example, a communication controller as discussed herein. An identifier determining means 2402 may correspond to, for example, a provisioning controller as discussed herein. A sending means 2404 may correspond to, for example, a communication controller as discussed herein. A receiving means 2502 may correspond to, for example, a communication controller as discussed herein. An access enablement determining means 2504 may correspond to, for example, an access controller as discussed herein. A configuration-based determining means 2506 may correspond to, for example, an access controller as discussed herein. A list maintaining means 2508 may correspond to, for example, an access controller as discussed herein. A configuring means 2602 may correspond to, for example, a provisioning controller as discussed herein. A transmitting means 2604 may correspond to, for example, a communication controller as discussed herein. A receiving means 2606 may correspond to, for example, a communication controller as discussed herein. A sending means 2608 may correspond to, for example, a provisioning controller as discussed herein. A defining means 2610 may correspond to, for example, a provisioning controller as discussed herein. A monitoring means 2702 may correspond to, for example, a receiver as discussed herein. A beacon receiving means 2704 may correspond to, for example, a receiver as discussed herein. A sending means 2706 may correspond to, for example, a communication controller as discussed herein. A roaming list receiving means 2708 may correspond to, for example, a provisioning controller as discussed herein. A configuring means 2802 may correspond to, for example, a provisioning controller as discussed herein. A beacon receiving means 2804 may correspond to, for example, a receiver as discussed herein. A sending means 2806 may correspond to, for example, a communication controller as discussed herein. An authorization receiving means 2808 may correspond to, for example, an access controller as discussed herein. A prompting means 2810 may correspond to, for example, an access controller as discussed herein. A displaying means 2812 may correspond to, for example, an access controller as discussed herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In summary, it should be appreciated that a computer-readable medium may be implemented in any suitable computer-program product.

In view of the above, in some aspects a first method of communication comprises: determining an identifier for a set of at least one access point that is configured to provide at least one service only to a set of at least one access terminal, wherein the identifier uniquely identifies the set of at least one access point within an operator network; and sending the identifier to each access point in the set of at least one access point. In addition, in some aspects at least one of the following also may apply to the first method of communication: the identifier comprises a network identifier, and the network comprises a cellular operator domain; the identifier is determined in conjunction with activation of an access point of the set of at least one access point; the set of at least one access point comprises a plurality of access points that belong to a common administrative domain; the set of at least one access point comprises a plurality of access points that are associated with a common closed subscriber group; the identifier is text-based; each access point of the set of at least one access point is restricted to not provide, for at least one other access terminal, at least one of the group consisting of: signaling, data access, registration, and service; each access point of the set of at least one access point comprises a femto node or a pico node; determining the identifier comprises receiving a request for an identifier and determining whether the identifier is already in use by at least one other access point; if the requested identifier is already in use by the at least one other access point, sending the identifier comprises sending a response to the request that comprises an identifier that is not in use by any other access point; each access point of the set of at least one access point provides at least one other service to at least one other access terminal; the method further comprises assigning a unique device identifier to each access point of the set of at least one access point; each access point of the set of at least one access point provides different services for the set of at least one access terminal than for at least one other access terminal.

Also in view of the above, in some aspects a second method of communication comprises: receiving an identifier for a set of at least one access point at an access point of the set, wherein each access point of the set is configured to provide at least one service only to a set of at least one access terminal, and wherein the identifier uniquely identifies the at least one access point within an operator network; and transmitting the identifier over-the-air. In addition, in some aspects at least one of the following also may apply to the second method of communication: the method further comprises receiving a registration message from an access terminal of the set of at least one access terminal in response to the transmission of the identifier; the identifier comprises a network identifier, and the network comprises a cellular operator domain; the identifier is received as a result of activation of the access point that receives the identifier; the set of at least one access point comprises a plurality of access points that belong to a common administrative domain; the set of at least one access point comprises a plurality of access points that are associated with a common closed subscriber group; the identifier is text-based; each access point of the set of at least one access point is restricted to not provide, for at least one other access terminal, at least one of the group consisting of: signaling, data access, registration, and service; each access point of the set of at least one access point comprises a femto node or a pico node; each access point of the set of at least one access point provides at least one other service to at least one other access terminal; each access point of the set of at least one access point provides different services for the set of at least one access terminal than for at least one other access terminal; the identifier is received in response to a request for the identifier; the method further comprises determining a proposed identifier, wherein the request includes the proposed identifier.

Also in view of the above, in some aspects a third method of communication comprises: determining identifiers of access terminals of a set of access terminals; and sending the identifiers to at least one access point that is configured to provide at least one service only to the set of access terminals. In addition, in some aspects at least one of the following also may apply to the third method of communication: the identifiers comprise permanent identifiers for the access terminals; the identifiers comprise temporary identifiers for the access terminals; the identifiers comprise network address identities or mobile station integrated services digital network numbers; the identifiers are sent in response to a request from an access point of the at least one access point; the determination comprises receiving the identifiers from a network node; the determination comprises receiving the identifiers from a web server that enables a user to specify access terminals that are allowed to receive the at least one service from the at least one access point; the set of access terminals are associated with a common closed subscriber group; each access point of the at least one access point is restricted to not provide, for at least one other access terminal, at least one of the group consisting of: signaling, data access, registration, and service; each access point of the at least one access point comprises a femto node or a pico node; each access point of the at least one access point provides at least one other service to at least one other access terminal.

Also in view of the above, in some aspects a fourth method of communication comprises: receiving a message relating to a request by an access terminal to access an access point, wherein the message comprises a first identifier associated with the access terminal; determining a second identifier associated with the access terminal based on the first identifier; and determining whether the access terminal is allowed to receive service from the access point based on the second identifier and at least one identifier associated with the access point. In addition, in some aspects at least one of the following also may apply to the fourth method of communication: the first identifier comprises a temporary identifier and the second identifier comprises a permanent identifier; the second identifier comprises a network address identity of the access terminal or a mobile station integrated services digital network number of the access terminal; the second identifier identifies at least one closed subscriber group that the access terminal may access, and the at least one identifier associated with the access point comprises a closed subscriber group identifier associated with the access point; the at least one identifier associated with the access point comprises an access list for the access point and the determination of whether the access terminal is allowed to receive service from the access point comprises determining whether the second identifier is in the access list; a network node makes the determination of whether the access terminal is allowed to receive service from the access point, the message comprises a request from an access point for authenticating the access terminal, and the method further comprises sending, to the access point, a message indicative of the determination of whether the access terminal is allowed to receive service from the access point; the determination of the second identifier comprises sending the first identifier to a network node and receiving the second identifier from the network node; the access point makes the determination of whether the access terminal is allowed to receive service from the access point; the at least one identifier associated with the access point is received from a network node; the determination of whether the access terminal is allowed to receive service from the access point comprises: sending the second identifier and the at least one identifier associated with the access point to a network node, and receiving, from the network node, an indication of whether the access terminal is allowed to receive service from the access point; the determination of whether the access terminal is allowed to receive service from the access point comprises: sending the second identifier to a network node, and receiving the at least one identifier associated with the access point from the network node; the access point is restricted to not provide, for at least one other access terminal, at least one of the group consisting of: signaling, data access, registration, and service; the access point comprises a femto node or a pico node.

Also in view of the above, in some aspects a fifth method of communication comprises: receiving a request from an access point for authenticating an access terminal; and sending, to the access point, at least one identifier that identifies at least one set of access points from which the access terminal is allowed to receive at least one service. In addition, in some aspects at least one of the following also may apply to the fifth method of communication: the at least one identifier comprises a closed subscriber group identifier; the request comprises a network address identity of the access terminal or a mobile station integrated services digital network number of the access terminal; the method further comprises determining the at least one identifier based on a permanent identifier associated with the access terminal, and determining the permanent identifier based on a temporary identifier associated with the access terminal; the request comprises the temporary identifier; the determination of the permanent identifier comprises sending the temporary identifier to a network node and receiving the permanent identifier from the network node; the method further comprises receiving the at least one identifier from a network node; the access point is restricted to not provide, for at least one other access terminal, at least one of the group consisting of: signaling, data access, registration, and service; the access point comprises a femto node or a pico node.

Also in view of the above, in some aspects a sixth method of communication comprises: sending, by an access point, a request for authenticating an access terminal; and receiving, in response to the request, at least one identifier that identifies at least one set of access points from which the access terminal is allowed to receive at least one service. In addition, in some aspects at least one of the following also may apply to the sixth method of communication: the method further comprises determining whether the access terminal is allowed to receive service from the access point based on the at least one identifier; the at least one identifier comprises a closed subscriber group identifier; the at least one identifier identifies a closed subscriber group that the access terminal may access, and the determination comprises determining whether the at least one identifier matches a closed subscriber group identifier associated with the access point; the request is sent based on a determination that the access terminal is not listed in a local access list of the access point; the request comprises a network address identity of the access terminal or a mobile station integrated services digital network number of the access terminal; the request comprises a temporary identifier associated with the access terminal; the method further comprises obtaining session information associated with the access terminal from a network node, wherein: the session information comprises context information for the access terminal and the request comprises the context information; the access point is restricted to not provide, for at least one other access terminal, at least one of the group consisting of: signaling, data access, registration, and service; the access point comprises a femto node or a pico node.

Also in view of the above, in some aspects a seventh method of communication comprises: sending, by an access point, a request comprising an identifier of a set of at least one access terminal eligible to receive service from the access point; and receiving, in response to the request, a list of at least one access terminal authorized to receive service from the access point. In addition, in some aspects at least one of the following also may apply to the seventh method of communication: the method further comprises determining whether the access terminal is allowed to receive service from the access point based on the at least one identifier; the at least one identifier comprises at least one closed subscriber group identifier; the identifier comprises a list of at least one closed subscriber group identifier associated with the access terminal, and the determination comprises determining whether a closed subscriber group identifier associated with the access point is in the list; the request is sent based on a determination that the access terminal is not listed in a local access list of the access point; the request comprises a network address identity of the access terminal or a mobile station integrated services digital network number of the access terminal; the request comprises a temporary identifier associated with the access terminal; the method further comprises obtaining session information associated with the access terminal from a network node, wherein: the session information comprises context information for the access terminal, and the request comprises the context information; the access point is restricted to not provide, for at least one other access terminal, at least one of the group consisting of: signaling, data access, registration, and service; the access point comprises a femto node or a pico node.

Also in view of the above, in some aspects a eighth method of communication comprises: receiving, from a first access point, an identifier of at least one other access point that an access terminal is eligible to access; and determining, based on the identifier, whether to enable access to the at least one other access point. In addition, in some aspects at least one of the following also may apply to the eighth method of communication: the determining comprises prompting a user to determine whether to enable the access; the determining comprises displaying an indication of the identifier and receiving user input indicative of whether to enable the access; the method further comprises determining, based on configuration information, whether to automatically enable the access or to enable access in response to a prompt; the method further comprises maintaining a list of access points that the access terminal is enabled to access, wherein the determination is further based on the list; the method further comprises maintaining a list of access points that a user has elected to not access, wherein the determination is further based on the list; the identifier comprises a network identifier; the identifier comprises a closed subscriber group identifier; the identifier is received via an SMS message, an application protocol message, a radio link message, or a page; the identifier is received from a network node; each access point of the at least one access point is restricted to not provide, for at least one other access terminal, at least one of the group consisting of: signaling, data access, registration, and service; each access point of the at least one access point comprises a femto node or a pico node.

Also in view of the above, in some aspects a ninth method of communication comprises: configuring an access point to an initialization mode; transmitting a default beacon comprising a default configuration during the initialization mode; receiving a message from an access terminal in response to the default beacon; and sending a preferred roaming list to the access terminal in response to the message. In addition, in some aspects at least one of the following also may apply to the ninth method of communication: the default beacon comprising the default configuration is transmitted at a first power level, the method further comprising configuring the access point to a different operating mode whereby beacons are transmitted at a second power level that is higher than the first power level; the first power level provides a smaller coverage area than that provided by the second power level; the default configuration comprises a default network identifier that is different from a network identifier used for a non-initialization operating mode; the default configuration specifies default system and network identifiers of at least one access point of a highest priority and the preferred roaming list specifies other system and network identifiers of the at least one access point of the highest priority; the default beacon is transmitted at a default frequency, and the preferred roaming list specifies another beacon frequency for the access point that is different than the default frequency; the method further comprises defining the preferred roaming list based on another preferred roaming list associated with the access terminal; the method further comprises receiving the another preferred roaming list from the access terminal; the method further comprises receiving the another preferred roaming list from a network node; the access point is restricted to not provide, for at least one other access terminal, at least one of the group consisting of: signaling, data access, registration, and service; the access point comprises a femto node or a pico node.

Also in view of the above, in some aspects a tenth method of communication comprises: monitoring, at an access terminal, for beacons based on a first preferred roaming list that specifies a default configuration; receiving a beacon comprising the default configuration from an access point as a result of the monitoring; sending a message to the access point in response to the received beacon; and receiving a second roaming list from the access point in response to the message, wherein the second roaming list specifies a different configuration than the default configuration. In addition, in some aspects at least one of the following also may apply to the tenth method of communication: the first preferred roaming list comprises a default roaming list for initialization operations, and the second preferred roaming list comprises a roaming list for non-initialization operations; the default configuration comprises a default network identifier; the second preferred roaming list comprises another network identifier associated with the access point that is different than the default network identifier; the beacon is received at a default frequency specified by the first preferred roaming list, and the second preferred roaming list specifies a carrier frequency for the access point that is different than the default frequency; the access point is restricted to not provide, for at least one other access terminal, at least one of the group consisting of: signaling, data access, registration, and service; the access point comprises a femto node or a pico node.

Also in view of the above, in some aspects a eleventh method of communication comprises: configuring an access point with a first identifier of an access terminal; obtaining a second identifier of the access terminal based on the first identifier; receiving a message requesting access by the access terminal; and determining, at the access point, whether to allow the requested access based on the second identifier. In addition, in some aspects at least one of the following also may apply to the eleventh method of communication: the first identifier comprises a network address identity or a mobile station integrated services digital network number; the second identifier comprises an electronic serial number or an international mobile subscriber identity; the obtaining comprises: sending the first identifier to a network node, and receiving the second identifier from the network node as a result of sending the first identifier; the determination comprises comparing an identifier received via the message from the access terminal with the second identifier; the determination comprises: sending the second identifier to a network node, and receiving, as a result of sending the second identifier, an indication as to whether to allow the requested access; the access point is configured via a web interface; the access point is restricted to not provide, for at least one other access terminal, at least one of the group consisting of: signaling, data access, registration, and service; the access point comprises a femto node or a pico node.

Also in view of the above, in some aspects a twelfth method of communication comprises: configuring an access terminal with a preferred roaming list that includes an identifier of a set of access points that are restricted to provide service to limited sets of access terminals; receiving a beacon from one of the access points, wherein the beacon comprises the identifier; sending a message to the one access point in response the beacon; and receiving authorization to access the one access point in response to the message. In addition, in some aspects at least one of the following also may apply to the twelfth method of communication: the set of access points comprises all access point in a cellular operator domain that are restricted to provide service to limited sets of access terminals; the identifier comprises a network identifier; the preferred roaming list specifies a carrier frequency used by the set of access points; the method further comprises prompting a user to determine whether to access the one access point; the method further comprises displaying an indication of the one access point and receiving user input indicative of whether to access the one access point; the access terminal automatically determines whether to access the one access point; each access point of the set of access points is restricted to not provide, for at least one other access terminal, at least one of the group consisting of: signaling, data access, registration, and service; each access point of the set of access points comprises a femto node or a pico node.

Also in view of the above, in some aspects a thirteenth method of communication comprises: receiving a request from an access point for authenticating an access terminal; determining whether the access terminal is allowed to receive service from the access point based on an identifier of a set of at least one access terminal that receives service from the access point; and sending a message indicative of the determination to the access point. In addition, in some aspects at least one of the following also may apply to the thirteenth method of communication: the determination comprises determining whether the identifier is in an access list of the access point; the request comprises the access list; the identifier comprises a permanent identifier, the method further comprising determining the permanent identifier based on a temporary identifier of the set of at least one access terminal; the determination of the permanent identifier comprises sending the temporary identifier to a network node and receiving the permanent identifier from the network node; the identifier comprises a closed subscriber group identifier; the identifier comprises a list of at least one closed subscriber group identifier associated with the set of at least one access terminal, and the determination comprises determining whether a closed subscriber group identifier associated with the access point is in the list; the access point is restricted to not provide, for at least one other access terminal, at least one of the group consisting of: signaling, data access, registration, and service; the access point comprises a femto node or a pico node.

Also in view of the above, in some aspects a fourteenth method of communication comprises: receiving, at an access point, an access request from an access terminal, wherein the access request comprises a first identifier associated with the access terminal; determining a second identifier associated with the access terminal based on the first identifier; and determining whether the access terminal is allowed to receive service from the access point based on the second identifier and a list of at least one access terminal authorized to receive service from the access point. In addition, in some aspects at least one of the following also may apply to the fourteenth method of communication: the first identifier comprises a temporary identifier and the second identifier comprises a permanent identifier; the first identifier comprises a network address identity of the access terminal or a mobile station integrated services digital network number of the access terminal; the list is received from a network node and comprises individual access terminal identifiers; the second identifier comprises a closed subscriber group identifier associated with the access terminal, and the list comprises a closed subscriber group identifier associated with the access point; the determination comprises: sending the second identifier and the list to a network node, and receiving, from the network node, an indication of whether the access terminal is allowed to receive service from the access point; the determination comprises: sending the second identifier to a network node, and receiving the list from the network node; the access point is restricted to not provide, for at least one other access terminal, at least one of the group consisting of: signaling, data access, registration, and service; the access point comprises a femto node or a pico node.

In some aspects, functionality corresponding to one or more of the above aspects of the first, second, third, fourth, fifth, sixth, seventh, eighth, ninth, tenth, eleventh, twelfth, thirteenth, and fourteenth methods of communication may be implemented, for example, in an apparatus using structure as taught herein. In addition, a computer-program product may comprise codes configured to cause a computer to provide functionality corresponding to one or more of the above aspects of these methods of communication.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
   receiving, at an access point, a message relating to a request by an access terminal to access the access point, wherein the message comprises an International Mobile Subscriber Identity (IMSI) associated with the access terminal;
   sending, by the access point, the IMSI associated with the access terminal to a network node;
   determining, by a hardware processor, a second identifier associated with the access terminal based on the IMSI, wherein the second identifier identifies a plurality of access points that comprise at least one base station and that are physically remote from one another; and
   determining whether the access terminal is allowed to receive service from the access point based on the second identifier and at least one identifier associated with the access point.

2. The method of claim 1, wherein the second identifier comprises a permanent identifier.

3. The method of claim 1, wherein:
   the second identifier identifies at least one closed subscriber group that the access terminal may access; and
   the at least one identifier associated with the access point comprises a closed subscriber group identifier associated with the access point.

4. The method of claim 3, wherein the network node determines whether the closed subscriber group associated with the access point is on a list of identifiers associated with the access terminal.

5. The method of claim 1, wherein the determination of the second identifier comprises receiving the second identifier identifying the plurality of access points from the network node.

6. The method of claim 1, wherein:
   the network node makes the determination of whether the access terminal is allowed to receive service from the access point;
   the message comprises a request from an access point for authenticating the access terminal; and
   the method further comprises sending, to the access point, a message indicative of the determination of whether the access terminal is allowed to receive service from the access point.

7. The method of claim 1, wherein the access point makes the determination of whether the access terminal is allowed to receive service from the access point.

8. The method of claim 7, wherein the at least one identifier associated with the access point is received from a network node.

9. The method of claim 7, wherein the determination of whether the access terminal is allowed to receive service from the access point comprises:
   sending the second identifier and the at least one identifier associated with the access point to a network node; and
   receiving, from the network node, an indication of whether the access terminal is allowed to receive service from the access point.

10. The method of claim 1, wherein the access point is restricted to not provide, for at least one other access terminal, at least one of the group consisting of: signaling, data access, registration, and service.

11. The method of claim 1, wherein the plurality of access points further comprise at least one of a NodeB, an eNodeB, and a radio network controller (RNC).

12. An apparatus for communication, comprising:
   means for receiving, at an access point, a message relating to a request by an access terminal to access the access point, wherein the message comprises an International Mobile Subscriber Identity (IMSI) associated with the access terminal;
   means for sending, by the access point, the IMSI associated with the access terminal to a network node;
   means for determining, by a hardware processor, a second identifier associated with the access terminal based on the IMSI, wherein the second identifier identifies a plurality of access points that comprise at least one base station and that are physically remote from one another; and
   means for determining whether the access terminal is allowed to receive service from the access point based on the second identifier and at least one identifier associated with the access point.

13. The apparatus of claim 12, wherein the second identifier comprises a permanent identifier.

14. The apparatus of claim 12, wherein:
   the second identifier identifies at least one closed subscriber group that the access terminal may access; and
   the at least one identifier associated with the access point comprises a closed subscriber group identifier associated with the access point.

15. The apparatus of claim 12, wherein the determination of the second identifier comprises receiving the second identifier identifying the plurality of access points from the network node.

16. The apparatus of claim 12, wherein:
the network node makes the determination of whether the access terminal is allowed to receive service from the access point;
the message comprises a request from an access point for authenticating the access terminal; and
the apparatus further comprising means for sending, to the access point, a message indicative of the determination of whether the access terminal is allowed to receive service from the access point.

17. The apparatus of claim 12, wherein the access point makes the determination of whether the access terminal is allowed to receive service from the access point.

18. The apparatus of claim 17, wherein the at least one identifier associated with the access point is received from a network node.

19. The apparatus of claim 17, wherein the determination of whether the access terminal is allowed to receive service from the access point comprises:
sending the second identifier and the at least one identifier associated with the access point to a network node; and
receiving, from the network node, an indication of whether the access terminal is allowed to receive service from the access point.

20. The apparatus of claim 12, wherein the access point is restricted to not provide, for at least one other access terminal, at least one of the group consisting of: signaling, data access, registration, and service.

21. An apparatus for communication, comprising:
a communication controller configured to receive a message relating to a request by an access terminal to access an access point, wherein the message comprises an International Mobile Subscriber Identity (IMSI) associated with the access terminal, wherein the communication controller is further configured to send the IMSI associated with the access terminal to a network node; and
an access controller, comprising hardware, configured to determine a second identifier associated with the access terminal based on the IMSI, wherein the second identifier identifies a plurality of access points that comprise at least one base station and that are physically remote from one another, and to determine whether the access terminal is allowed to receive service from the access point based on the second identifier and at least one identifier associated with the access point.

22. The apparatus of claim 21, wherein the second identifier comprises a permanent identifier.

23. The apparatus of claim 21, wherein:
the second identifier identifies at least one closed subscriber group that the access terminal may access; and
the at least one identifier associated with the access point comprises a closed subscriber group identifier associated with the access point.

24. The apparatus of claim 21, wherein:
a network node makes the determination of whether the access terminal is allowed to receive service from the access point;
the message comprises a request from an access point for authenticating the access terminal; and
the communication controller is further configured to send, to the access point, a message indicative of the determination of whether the access terminal is allowed to receive service from the access point.

25. The apparatus of claim 21, wherein the access point makes the determination of whether the access terminal is allowed to receive service from the access point.

26. A computer-program product, comprising:
a non-transitory computer-readable medium comprising codes for causing a computer to:
receive, at an access point, a message relating to a request by an access terminal to access the access point, wherein the message comprises an International Mobile Subscriber Identity (IMSI) associated with the access terminal;
send, by the access point, the IMSI associated with the access terminal to a network node;
determine a second identifier associated with the access terminal based on the IMSI, wherein the second identifier identifies a plurality of access points that comprise at least one base station and that are physically remote from one another; and
determine whether the access terminal is allowed to receive service from the access point based on the second identifier and at least one identifier associated with the access point.

27. The computer-program product of claim 26, wherein the second identifier comprises a permanent identifier.

28. A method of communication, comprising:
receiving, by a network node comprising a hardware processor, a request from an access point for authenticating an access terminal; and
sending, to the access point, at least one identifier that identifies a plurality of access points that comprise at least one base station and that are physically remote from one another from which the access terminal is allowed to receive at least one service, wherein the at least one identifier is determined based on an International Mobile Subscriber Identity (IMSI) associated with the access terminal, and wherein the IMSI is received at the access point in a message relating to a request by the access terminal to access the access point.

29. The method of claim 28, wherein the at least one identifier comprises a closed subscriber group identifier.

30. The method of claim 28, further comprising determining the at least one identifier based on a permanent identifier associated with the access terminal, the method further comprising determining the permanent identifier based on a temporary identifier associated with the access terminal.

31. The method of claim 30, wherein the determination of the permanent identifier comprises sending the temporary identifier to a network node and receiving the permanent identifier from the network node.

32. The method of claim 28, further comprising receiving the at least one identifier to the access point.

33. The method of claim 28, wherein the access point is restricted to not provide, for at least one other access terminal, at least one of the group consisting of: signaling, data access, registration, and service.

34. The method of claim 28, wherein the plurality of access points further comprise at least one of a NodeB, an eNodeB, and a radio network controller (RNC).

35. An apparatus for communication, comprising:
means for receiving, at a network node, a request from an access point for authenticating an access terminal; and
means for sending, to the access point, at least one identifier that identifies a plurality of access points that comprise at least one base station and that are physically remote from one another from which the access terminal is allowed to receive at least one service, wherein the at least one identifier is determined based on an International Mobile Subscriber Identity (IMSI) associated with the access terminal, and wherein the IMSI is received at the access point in a message relating to a request by the access terminal to access the access point.

36. The apparatus of claim 35, wherein the at least one identifier comprises a closed subscriber group identifier.

37. The apparatus of claim 35, further comprising means for determining the at least one identifier based on a permanent identifier associated with the access terminal, and for determining the permanent identifier based on a temporary identifier associated with the access terminal.

38. The apparatus of claim 37, wherein the determination of the permanent identifier comprises sending the temporary identifier to a network node and receiving the permanent identifier from the network node.

39. The apparatus of claim 35, wherein the means for receiving is configured to receive the at least one identifier to the access point.

40. The apparatus of claim 35, wherein the access point is restricted to not provide, for at least one other access terminal, at least one of the group consisting of: signaling, data access, registration, and service.

41. An apparatus for communication, comprising:
a communication controller at a network node, comprising hardware, configured to receive a request from an access point for authenticating an access terminal; and
an access controller configured to send, to the access point, at least one identifier that identifies a plurality of access points that comprise at least one base station and that are physically remote from one another from which the access terminal is allowed to receive at least one service, wherein the at least one identifier is determined based on a an International Mobile Subscriber Identity (IMSI) associated with the access terminal, and wherein the IMSI is received at the access point in a message relating to a request by the access terminal to access the access point.

42. The apparatus of claim 41, wherein the at least one identifier comprises a closed subscriber group identifier.

43. The apparatus of claim 41, wherein the access controller is further configured to determine the at least one identifier based on a permanent identifier associated with the access terminal, and to determine the permanent identifier based on a temporary identifier associated with the access terminal.

44. The apparatus of claim 41, wherein the communication controller is further configured to receive the at least one identifier to the access point.

45. A computer-program product, comprising:
a non-transitory computer-readable medium comprising codes for causing a computer to:
receive, at a network node, a request from an access point for authenticating an access terminal; and
send, to the access point, at least one identifier that identifies a plurality of access points that comprise at least one base station and that are physically remote from one another from which the access terminal is allowed to receive at least one service, wherein the at least one identifier is determined based on an International Mobile Subscriber Identity (IMSI) associated with the access terminal, and wherein the IMSI is received at the access point in a message relating to a request by the access terminal to access the access point.

46. The computer-program product of claim 45, wherein the at least one identifier comprises a closed subscriber group identifier.

47. A method of communication, comprising:
sending, by an access point comprising hardware, a request for authenticating an access terminal to a network node; and
receiving from the network node, in response to the request, at least one identifier that identifies a plurality of access points that comprise at least one base station and that are physically remote from one another from which the access terminal is allowed to receive at least one service, wherein the at least one identifier is determined based on an International Mobile Subscriber Identity (IMSI) associated with the access terminal, and wherein the IMSI is received at the access point in a message relating to a request by the access terminal to access the access point.

48. The method of claim 47, wherein the plurality of access points further comprise at least one of a NodeB, an eNodeB, and a radio network controller (RNC).

49. The method of claim 47, further comprising determining whether the access terminal is allowed to receive service from the access point based on the at least one identifier.

50. The method of claim 49, wherein the at least one identifier comprises a closed subscriber group identifier.

51. The method of claim 49, wherein:
the at least one identifier identifies a closed subscriber group that the access terminal may access; and
the determination comprises determining whether the at least one identifier matches a closed subscriber group identifier associated with the access point.

52. The method of claim 47, wherein the request is sent based on a determination that the access terminal is not listed in a local access list of the access point.

53. The method of claim 47, wherein the access point is restricted to not provide, for at least one other access terminal, at least one of the group consisting of: signaling, data access, registration, and service.

54. An apparatus for communication, comprising:
means for sending, by an access point, a request for authenticating an access terminal to a network node; and
means for receiving from the network node, in response to the request, at least one identifier that identifies a plurality of access points that comprise at least one base station and that are physically remote from one another from which the access terminal is allowed to receive at least one service, wherein the at least one identifier is determined based on an International Mobile Subscriber Identity (IMSI) associated with the access terminal, and wherein the IMSI is received at the access point in a message relating to a request by the access terminal to access the access point.

55. The apparatus of claim 54, further comprising means for determining whether the access terminal is allowed to receive service from the access point based on the at least one identifier.

56. The apparatus of claim 55, wherein the at least one identifier comprises a closed subscriber group identifier.

57. The apparatus of claim 55, wherein:
the at least one identifier identifies a closed subscriber group that the access terminal may access; and
the determination comprises determining whether the at least one identifier matches a closed subscriber group identifier associated with the access point.

58. The apparatus of claim 54, wherein the request is sent based on a determination that the access terminal is not listed in a local access list of the access point.

59. The apparatus of claim 54, wherein the access point is restricted to not provide, for at least one other access terminal, at least one of the group consisting of: signaling, data access, registration, and service.

60. An apparatus for communication, comprising:
an access controller configured to send, by an access point comprising hardware, a request for authenticating an access terminal to a network node; and
a communication controller configured to receive from the network node, in response to the request, at least one identifier that identifies a plurality of access points that comprise at least one base station and that are physically remote from one another from which the access terminal is allowed to receive at least one service, wherein the at least one identifier is determined based on an International Mobile Subscriber Identity (IMSI) associated with the access terminal, and wherein the IMSI is received at the access point in a message relating to a request by the access terminal to access the access point.

61. The apparatus of claim 60, wherein the access controller is further configured to determine whether the access terminal is allowed to receive service from the access point based on the at least one identifier.

62. The apparatus of claim 61, wherein:
the at least one identifier identifies a closed subscriber group that the access terminal may access; and
the determination comprises determining whether the at least one identifier matches a closed subscriber group identifier associated with the access point.

63. The apparatus of claim 60, wherein the request is sent based on a determination that the access terminal is not listed in a local access list of the access point.

64. A computer-program product, comprising:
a non-transitory computer-readable medium comprising codes for causing a computer to:
send, by an access point, a request for authenticating an access terminal to a network node; and
receive from the network node, in response to the request, at least one identifier that identifies a plurality of access points that comprise at least one base station and that are physically remote from one another from which the access terminal is allowed to receive at least one service, wherein the at least one identifier is determined based on an International Mobile Subscriber Identity (IMSI) associated with the access terminal, and wherein the IMSI is received at the access point in a message relating to a request by the access terminal to access the access point.

65. The computer-program product of claim 64, wherein the computer-readable medium further comprises codes for causing the computer to determine whether the access terminal is allowed to receive service from the access point based on the at least one identifier.

66. A method of communication, comprising:
configuring an access point with an International Mobile Subscriber Identity (IMSI) of an access terminal, wherein the IMSI is received at the access point in a message relating to a request by the access terminal to access the access point;
obtaining a second identifier of the access terminal based on the IMSI, wherein the second identifier identifies a plurality of access points that comprise at least one base station and that are physically remote from one another, wherein the obtaining comprises:
sending the IMSI of the access terminal to a network node; and
receiving the second identifier of the access terminal from the network node as a result of sending the IMSI;
receiving a message requesting access by the access terminal; and
determining, at the access point, whether to allow the requested access based on the second identifier.

67. The method of claim 66, wherein the plurality of access points further comprise at least one of a NodeB, an eNodeB, and a radio network controller (RNC).

68. The method of claim 66, wherein the second identifier comprises an electronic serial number or an international mobile subscriber identity.

69. The method of claim 66, wherein the determination comprises:
sending the second identifier to a network node; and
receiving, as a result of sending the second identifier, an indication as to whether to allow the requested access.

70. The method of claim 66, wherein the access point is restricted to not provide, for at least one other access terminal, at least one of the group consisting of: signaling, data access, registration, and service.

71. An apparatus for communication, comprising:
means for configuring an access point with an International Mobile Subscriber Identity (IMSI) of an access terminal, wherein the IMSI is received at the access point in a message relating to a request by the access terminal to access the access point;
means for obtaining a second identifier of the access terminal based on the IMSI, wherein the second identifier identifies a plurality of access points that comprise at least one base station and that are physically remote from one another, wherein the means for obtaining comprises:
means for sending the IMSI of the access terminal to a network node; and
means for receiving the second identifier of the access terminal from the network node as a result of sending the IMSI;
means for receiving a message requesting access by the access terminal; and
means for determining, at the access point, whether to allow the requested access based on the second identifier.

72. The apparatus of claim 71, wherein the second identifier comprises an electronic serial number or an international mobile subscriber identity.

73. The apparatus of claim 71, wherein the determination comprises:
sending the second identifier to a network node; and
receiving, as a result of sending the second identifier, an indication as to whether to allow the requested access.

74. The apparatus of claim 71, wherein the access point is restricted to not provide, for at least one other access terminal, at least one of the group consisting of: signaling, data access, registration, and service.

75. An apparatus for communication, comprising:
a provisioning controller, comprising hardware, configured to configure an access point with an International Mobile Subscriber Identity (IMSI) of an access terminal, wherein the IMSI is received at the access point in a message relating to a request by the access terminal to access the access point;
an access controller configured to obtain a second identifier of the access terminal based on the IMSI, wherein the second identifier identifies a plurality of access points that comprise at least one base station and that are physically remote from one another, wherein the access controller is further configured to:
send the IMSI of the access terminal to a network node; and
receive the second identifier of the access terminal from the network node as a result of sending the IMSI; and
a communication controller configured to receive a message requesting access by the access terminal;
wherein the access controller is further configured to determine, at the access point, whether to allow the requested access based on the second identifier.

76. The apparatus of claim 75, wherein the second identifier comprises an electronic serial number or an international mobile subscriber identity.

77. A computer-program product, comprising:
a non-transitory computer-readable medium comprising codes for causing a computer to:
configure an access point with an International Mobile Subscriber Identity (IMSI) of an access terminal, wherein the IMSI is received at the access point in a message relating to a request by the access terminal to access the access point;
obtain a second identifier of the access terminal based on the IMSI, wherein the second identifier identifies a plurality of access points that comprise at least one base station and that are physically remote from one another, wherein to obtain the second identifier, the computer-readable medium further comprises codes for causing the computer to:
send the IMSI of the access terminal to a network node; and
receive the second identifier of the access terminal from the network node as a result of sending the IMSI;
receive a message requesting access by the access terminal; and
determine, at the access point, whether to allow the requested access based on the second identifier.

* * * * *